(12) United States Patent
Hall et al.

(10) Patent No.: US 11,645,680 B2
(45) Date of Patent: May 9, 2023

(54) METHOD AND SYSTEM FOR DISTRIBUTING ELECTRONIC PUBLISHING CONTENT

(71) Applicant: PLAYGROUND XYZ IP PTY LTD, Sydney (AU)

(72) Inventors: Rob Hall, Sydney (AU); Scot Liddell, Sydney (AU); Jonathan Mullins, Sydney (AU)

(73) Assignee: Playground (XYZ) Holdings Pty Ltd, Sydney (AU)

( * ) Notice: Subject to any disclaimer, the term of this patent is extended or adjusted under 35 U.S.C. 154(b) by 163 days.

(21) Appl. No.: 15/775,722

(22) PCT Filed: Nov. 11, 2016

(86) PCT No.: PCT/AU2016/051091
§ 371 (c)(1),
(2) Date: May 11, 2018

(87) PCT Pub. No.: WO2017/079809
PCT Pub. Date: May 18, 2017

(65) Prior Publication Data
US 2018/0349966 A1    Dec. 6, 2018

(30) Foreign Application Priority Data
Nov. 13, 2015    (AU) .................................. 2015904696

(51) Int. Cl.
*G06Q 30/0241* (2023.01)
*G06F 16/958* (2019.01)

(52) U.S. Cl.
CPC ....... *G06Q 30/0277* (2013.01); *G06F 16/986* (2019.01)

(58) Field of Classification Search
CPC combination set(s) only.
See application file for complete search history.

(56) References Cited

U.S. PATENT DOCUMENTS

| 5,905,862 A | 5/1999 | Hoekstra |
| 6,605,120 B1 * | 8/2003 | Fields ................. G06F 16/9535 715/239 |

(Continued)

FOREIGN PATENT DOCUMENTS

| EP | 2843607 | 3/2015 |
| WO | WO 2008/011294 | 1/2008 |
| WO | WO 2015/063260 | 5/2015 |

OTHER PUBLICATIONS

"Producing Interactive Paper Documents based on MultiChannel Content Publishing" Authors: Michael Grossniklaus, Moira C. Norrie, Beat Signer and Nadir Weibel (Year: 2007).*

(Continued)

*Primary Examiner* — Victoria E. Frunzi
(74) *Attorney, Agent, or Firm* — Keller Preece PLLC

(57) ABSTRACT

Disclosed herein are a method and system for distributing electronic publishing content. The method includes the steps of: defining an independent naming convention for functional components of host web pages; analyzing a predefined set of destination pages to determine a set of representational states for each destination page and a set of conditional statements that determine when a destination page is in each representational state; analyzing the destination pages to identify host-specific naming conventions associated with each representational state of the destination pages; receiving a request for advertising content in relation to an advertisement to be displayed within a destination host page on a user computing device requesting a mapping between the independent naming convention and a host-specific naming convention associated with each representational state of the destination host page; applying the mapping to the advertising content; and transmitting the destination content to the user computing device.

18 Claims, 24 Drawing Sheets

(56) References Cited

U.S. PATENT DOCUMENTS

| | | | |
|---|---|---|---|
| 7,996,259 B1 | 8/2011 | Distefano, III et al. | |
| 8,086,957 B2 * | 12/2011 | Bauchot | G06Q 30/02 715/234 |
| 8,893,294 B1 * | 11/2014 | Steele, III | G06F 16/9574 726/26 |
| 9,224,151 B2 * | 12/2015 | Sinyagin | G06Q 30/02 |
| 2011/0106615 A1 | 5/2011 | Churchill et al. | |
| 2014/0181193 A1 * | 6/2014 | Narasimhan | H04W 4/21 709/204 |
| 2015/0294375 A1 | 10/2015 | Stergiou et al. | |

OTHER PUBLICATIONS

International Search Report and Written Opinion as received in PCT/AU2016/051091 dated Feb. 3, 2017.

International Preliminary Report on Patentability as received in PCT/AU2016/051091 dated Mar. 20, 2018.

* cited by examiner

Host Site 1

```
<!DOCTYPE html>
<html>
 <head></head>
 <body>
   <header></header>
   <nav> </nav>
 </body>
</html>
```

Fig. 1A

Host Site 2

```
<!DOCTYPE html>
<html>
<head></head>
<body>
   <div class="header"></div>
   <ul class="navigation"></ul>
   <div id="share-panel"></div>
</body>
</html>
```

Fig. 1B

Host Site 3

```
<!DOCTYPE html>
<html>
<head></head>
<body>
   <div id="page-header"></div>
   <div id="top-nav"></div>
   <div id="social-buttons"></div>
</body>
</html>
```

Fig. 1C

Host Site 1

```
<!DOCTYPE html>                          State: default
<html>
  <head></head>
  <body>                                 Page
    <header></header>                    Header
    <nav> </nav>                         Navigation
  </body>
</html>
```

Fig. 3A

Host Site 2

```
<!DOCTYPE html>                          State: default
<html>
<head></head>
<body>                                   Page
    <div class="header"></div>           Header
    <ul class="navigation"></ul>         Navigation
    <div id="share-panel"></div>
    </body>
</html>
```

Fig. 3B

Host Site 2

```
<!DOCTYPE html>                          State: scrolling up
<html>
<head></head>
<body>                                   Page
    <div class="header"></div>           Header
    <ul class="navigation"></ul>         Navigation
    <div id="share-panel"></div>         Header
    </body>
</html>
```

Fig. 3C

Host Site 3

```
<!DOCTYPE html>                                    State: default
<html>
<head></head>
<body>                                      Page
    <div id="page-header"></div>            Header
    <div id="top-nav"></div>                Navigation
    <div id="social-buttons"></div>
</body>
</html>
```

Fig. 3D

Host Site 3

```
<!DOCTYPE html>                                    State: scrolling up
<html>
<head></head>
<body>                                           Page
    <div id="page-header"></div>                 Header
    <div id="top-nav"></div>                     Navigation
    <div id="social-buttons"></div>              Header
</body>
</html>
```

Fig. 3E

METHOD AND SYSTEM FOR DISTRIBUTING ELECTRONIC PUBLISHING CONTENT

CROSS-REFERENCE TO RELATED APPLICATIONS

This application is a national phase entry under 35 U.S.C. § 371 of International Application No. PCT/AU2016/051091, filed 11 Nov. 2016, which claims the benefit of Australian Provisional Patent Application No. 2015904696 titled "A method and system for distributing electronic publishing content" and filed on 13 Nov. 2015. The entire contents of each of the foregoing patent applications are hereby incorporated by reference.

BACKGROUND OF THE INVENTION

1. Field of the Invention

The present disclosure relates to online publishing. In particular, the present disclosure relates to a method and system for distributing electronic publishing content.

2. Background and Relevant Art

The online environment provided by networked computers provides many means for delivering content to a user. Such means include, for example, email, Short Message Service (SMS) text messages, Multimedia Messaging Service (MMS) messages, webpages, pop-up advertisements, and the like.

In the context of this application, the term "publisher" is used in a broad sense to refer to a person or entity that publishes content and includes the owner of a website or software application ("app") on which content is published. A publisher may also refer to an owner of a set of online publications, domain names, websites, apps, and the like.

Advertisers, such as brands and companies, use a variety of media to advertise their products (goods or services). Such media may be classified into "offline advertising" and "online advertising". Offline advertising includes, for example, printed publications (such as pamphlets, brochures, newspapers, posters, and billboards), radio advertisements, and television commercials. Online advertising (also referred to as "digital advertising") includes advertisements provided to a user via a computing device coupled to a communications network. The communications network can include, for example, a computer network, the Internet, the World Wide Web, mobile communications networks, and the like. For example, advertising can be provided on a web page viewed by a user in a browser executing on a computing device or within an app executing on a computing device.

Digital advertising can take many forms. Search engines offer paid text-based advertisements (ads) that appear with search engine results. Banner ads are typically served within a web page with the intention of attracting traffic to a website by establishing a link to the website of the advertiser. Video content may be provided to a user before, during, after, or in-line with other online activities. Similarly, audio content may be played before, during, or after streamed audio content.

Each of the different forms of digital advertising may have multiple formats. For example, banner ads are available in a number of different formats.

In order for the advertising to scale across multiple websites and apps, publishers, technology vendors and the advertising industry at large have developed a set of specifications for each of the above forms of advertising. In particular, the Interactive Advertising Bureau (IAB) is an industry body that publishes and maintains this set of specifications. Providing a set of specifications enables advertisers and their respective advertising agencies to build an advertisement once and then deploy the advertisement across multiple publishers, who in turn have multiple websites and applications, without having to worry about the advertisement working properly. However, to ensure compatibility across websites, the set of specifications provides only a limited feature set.

While the vast majority of the digital advertising industry follows these industry-wide specifications, not all advertisers do so. Advertisers find it increasingly difficult to have their advertisements noticed in cluttered websites and applications and in order to 'stand out' often seek new and different ways to advertise. One way of doing so is through custom advertising, which deviates from the industry accepted advertising specifications. Publishers and other technology vendors seek to assist their advertising clients to stand out by intentionally creating new advertising formats that are novel and often proprietary. An example of this is Fairfax Media's Chameleon.

To execute a custom advertisement, the advertiser builds the advertisement for a specific publisher and then deploys the advertisement across that publisher and associated websites and/or applications. However, custom advertisements create problems for the advertisers themselves. Custom advertisements typically do not scale across different websites or other technical platforms and consequently require large investments of time and energy to make one advertisement work across multiple websites and applications of a single publisher, let alone across multiple publishers.

The inherent challenge to delivering custom advertising is that each website and application is technically different from the next. Since the very nature of custom advertising is working outside of the industry wide specifications, there exists no simple way to make an advertisement that works across multiple publishers whilst still enabling the advertisement to stand out by referencing, modifying, or interacting with the host page. Ultimately, the advertiser needs to build or modify one advertisement for each publisher or even for each website/application within the publisher.

As one example, in order for an advertiser to construct an advertisement to appear below a website header on multiple publishers, the advertiser must first obtain specific knowledge of each of the websites and applications, such as knowledge on the Hyper Text Markup Language (HTML) code pertaining to the header. Each of the destinations would have different (sometimes subtle, sometimes radical) ways the header is configured in the HTML. The advertiser must then create specific builds of the advertisement for the different publishers.

To add complexity, the website HTML is not static; it may take many different representations throughout the course of a user's experience with it. These representational states are the consequence of varying conditions including but not limited to: the current position of the viewport relative to the webpage document, the current scroll direction (up or down), the time elapsed since the user arrived on the page, the user's interactions with content on the page (e.g., clicking on a menu or interacting with some other dynamic component), whether or not the user has authenticated themselves to the site, the number of previous visits a user has made to a site, or the values from some external data source (e.g., weather information, a sporting result or schedule).

This means that the configuration of an ad may need not only to understand different host pages in terms of their initial representation as HTML, but also respond to the different representational states each page may take over the duration of a user's visit.

Thus, a need exists to provide an improved method and system for distributing electronic publishing content.

SUMMARY

The present disclosure relates to a method and system for distributing electronic publishing content.

In a first aspect, the present disclosure provides a method for distributing electronic publishing content, comprising the steps of:

defining an independent naming convention for functional components of web pages;

analysing a predefined set of destination pages to determine a set of representational states for each destination page and a set of conditional statements that determine when a destination page is in each representational state;

analysing the destination pages to identify host-specific naming conventions associated with each representational state of the destination pages;

storing in a host configuration database a mapping table, the mapping table establishing a mapping between the host-specific naming conventions associated with each representational state of the destination pages, the set of conditional statements associated with each representational state, and the independent naming conventions for each representational state;

a creative ad server receiving a request for advertising content in relation to an advertisement to be displayed within a destination host page on a user computing device, the destination host page being one of the set of destination pages;

the creative ad server requesting from the host configuration database a mapping between the independent naming convention and a host-specific naming convention associated with each representational state of the destination host page;

applying the mapping to the advertising content to produce destination content compliant with the destination host page; and the creative ad server transmitting the destination content to the user computing device.

A second aspect of the present disclosure provides a host configuration database coupled to a communications network, the host configuration database storing:

an independent naming convention for functional components of web pages;

a set of representational states for each destination page and a set of conditional statements that determine when a page is in each representational state; and a mapping between the independent naming convention and a host-specific naming convention associated with each representational state of a destination host page, based on said set of conditional statements;

wherein, on receipt from a source of a request for a mapping in relation to the destination host page, the host configuration database is adapted to:

determine a current representational state of said destination host page, based on said set of conditional statements;

identify a mapping associated with the current representational state; and transmit the mapping to the source.

A third aspect of the present disclosure provides a method for distributing electronic publishing content, comprising the steps of:

defining an independent naming convention for functional components of web pages;

analysing a predefined set of destination pages to determine a set of representational states for each destination page and a set of conditional statements that determine when a destination page is in each representational state;

analysing the destination pages to identify host-specific naming conventions associated with each representational state of destination pages;

storing in a host configuration database a mapping table, the mapping table establishing a mapping between the host-specific naming conventions associated with each representational state of the destination pages, the set of conditional statements associated with each representational state, and the independent naming convention;

a creative ad server receiving a request from a source for advertising content in relation to an advertisement to be displayed within a destination host page on a user computing device, the destination host page being one of the set of destination pages;

the creative ad server delivering creative content to the source, the creative content including an instruction to query the host configuration database to obtain a mapping between the independent naming convention and a destination host-specific naming convention associated with each representational state of the destination host page;

sending, based on the instruction, a request from the source to the host configuration database to obtain a mapping between the independent naming convention and the host-specific naming convention associated with each representational state of the destination host page;

the host configuration database transmitting the mapping to the source; and the source configuring the delivered creative content for the destination host page, based on the mapping.

According to another aspect, the present disclosure provides an apparatus for implementing any one of the aforementioned methods.

According to another aspect, the present disclosure provides a computer program product including a computer readable medium having recorded thereon a computer program for implementing any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which:

FIGS. 1A-C illustrate different three versions of HTML5 compliant documents for different host sites: Host Site 1, Host Site 2, and Host Site 3;

FIGS. 3A-E illustrate the code of Host Sites 1, 2, and 3 from the examples of FIGS. 1A-C, annotated in bold to identify functionally similar code in each representational state;

DEFINITIONS

Figure 2:
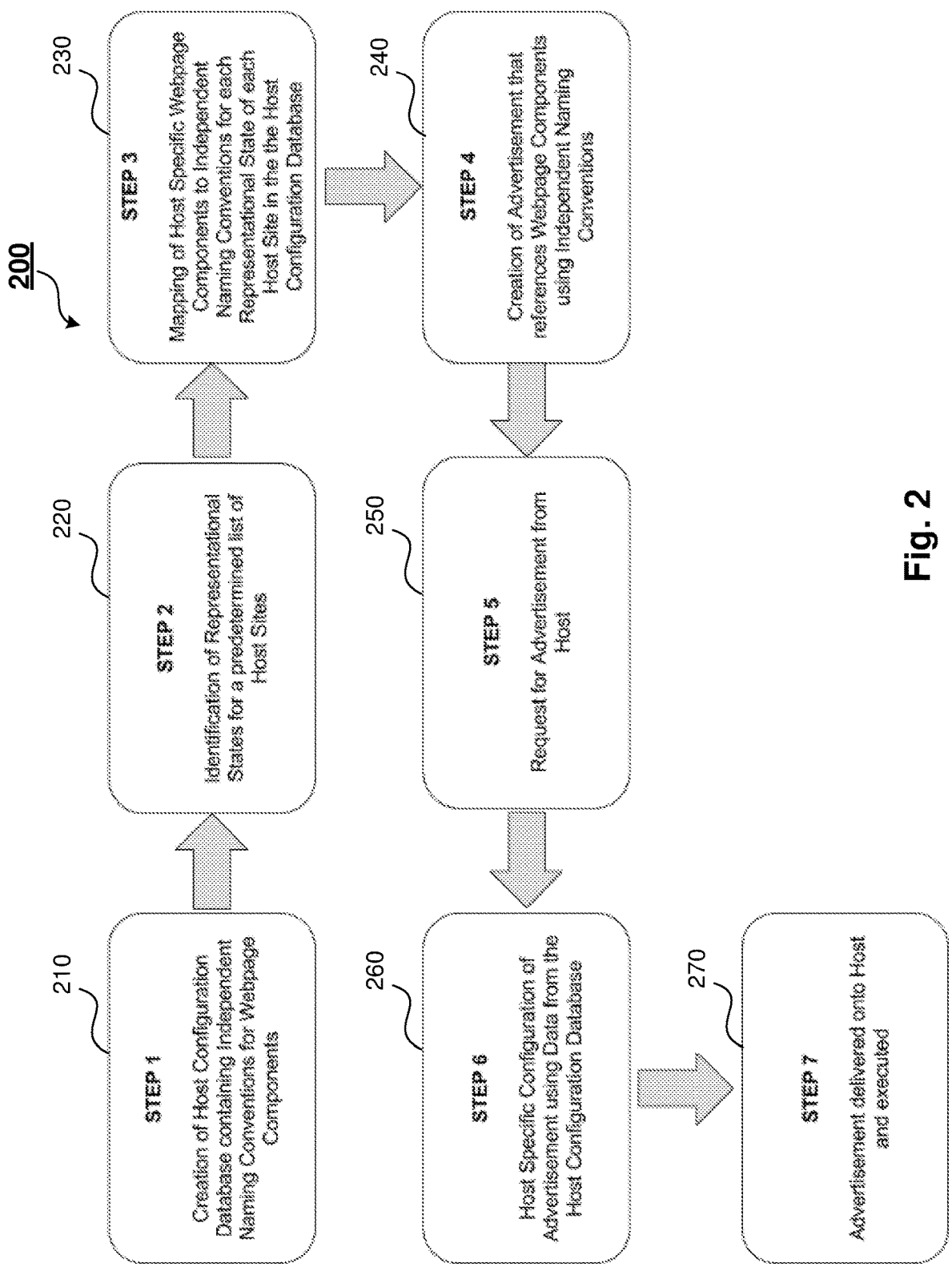
FIG. 2 is a flow diagram illustrating a method for distributing electronic publishing content in accordance with the present disclosure.

The following terms have the following meanings, unless the context suggests otherwise:

Ad file: An electronic file containing computer code which, when executed by a computing device, provides instructions to the device on how to retrieve a creative file or files. The instructions include, but are not limited to, information on where to source the creative file(s) in the form of one or more URLs.

Ad request: An HTTP request made from a browser to an ad server.

Ad server: A web server, the main function of which is to respond to requests for advertising content.

Certified format: A specification for advertising content (e.g., height, width, expanding/not-expanding) that is well supported and compatible with digital advertising technologies and publishers.

Creative: A piece of advertising content that can be delivered to one or more web pages.

Creative ad server: A web server, the main function of which is to respond to requests for computer code and images for advertising creative.

Creative file: An electronic file or collection of files containing digital media for the presentation of content on a computing device.

Custom format: Advertising that doesn't follow the specifications set out for a certified format, where specific knowledge of the host document is required in order for the creative content to function properly.

Digital media: A digital representation of some video, audio, text, imagery, or other human understandable content.

Host document: The HTML document containing the primary content for a single URL. Does not include content sourced from sub-requests to an ad server or creative ad server.

Placement: An area on a website reserved for advertising content.

Request: An HTTP request from a browser to fetch a HTML document from a web server.

Representational state: The visual layout of a webpage at a moment in time.

Sub-request: A secondary request from a browser to fetch content referenced by a HTML document.

Campaign: A commercial activity where advertising content is scheduled to run on one or more websites or applications over a period of time.

Viewport: The visible area of a web page when rendered in a browser.

DETAILED DESCRIPTION

Method steps or features in the accompanying drawings that have the same reference numerals are to be considered to have the same function(s) or operation(s), unless the contrary intention is expressed or implied.

The present disclosure provides a method and system for distributing electronic publishing content. In particular, the method and system of the present disclosure provide a standardised, independent naming convention for functional components of web pages, which allows advertising content to reference, modify, and/or interact with a host web page in a standard way. Such a method and system enable rich media capabilities to be scalable across webpages and applications in a reliable way.

The method of the present disclosure allows one generic advertisement to be built that can successfully reference, modify, and/or interact with designated host-specific webpage components on a set of predefined host pages. The designated webpage components are not restricted to an advertisement container within a host site, rather the designated webpage components may include any component of the host page. This enables advertisers to perform many functions, including, but not limited to, referencing, interacting, and/or modifying a logo of a host page, the page colour, the text style, and the like, across multiple host pages, as those host pages occupy different representational states. Thus, advertising content can detect, react, modify, and interact with multiple host pages based on the representational states of those host pages.

Web pages are written in a form of markup language called HTML. HTML5 is the latest revision of the specification. The specification defines a strict set of element types that may appear in an HTML5 document. Each element type can optionally declare one or more attributes, which give additional meaning to the element. A document is composed of a tree of HTML elements rooted at the element named html.

Whilst conventions and recommendations exist on what element types should be used for different components of a website, web developers are free to write HTML5 documents that represent the different site components using infinite combinations of element types and attributes and still be correct and valid HTML5 documents.

FIGS. 1A-C illustrate how three different websites (Host Site 1, Host Site 2, and Host Site 3) can define body, header, and navigation webpage components in different ways and still be valid HTML5 documents. In particular, FIG. 1A illustrates HTML5 compliant definitions for Host Site 1, FIG. 1B illustrates HTML5 compliant definitions for Host Site 2, and FIG. 1C illustrates HTML5 compliant definitions for Host Site 3.

The method and system of the present disclosure use a host configuration database, which stores a standardised, independent naming convention for webpage components. The independent naming convention functions as a classification system to standardise the referencing to functionally similar components across different host sites.

The host configuration database stores mappings from a standardised list of components to a set of specific representational states and host specific components for host pages and provides the mappings to a requesting source during the creative ad serving process. In one example, the requesting source is a creative ad server. When equipped with a mapping for the host page, the creative code returned by the creative ad server can reliably determine the current representational state of the host page and apply processing to specific functional components from the host page. In another example, the requesting source is a web browser that has received creative code from a creative ad server, wherein the creative code includes a request for a mapping from the host configuration database. The host configuration database returns the mapping, whereupon the web browser applies the mapping to configure creative content for a destination host page.

Figure 4A:
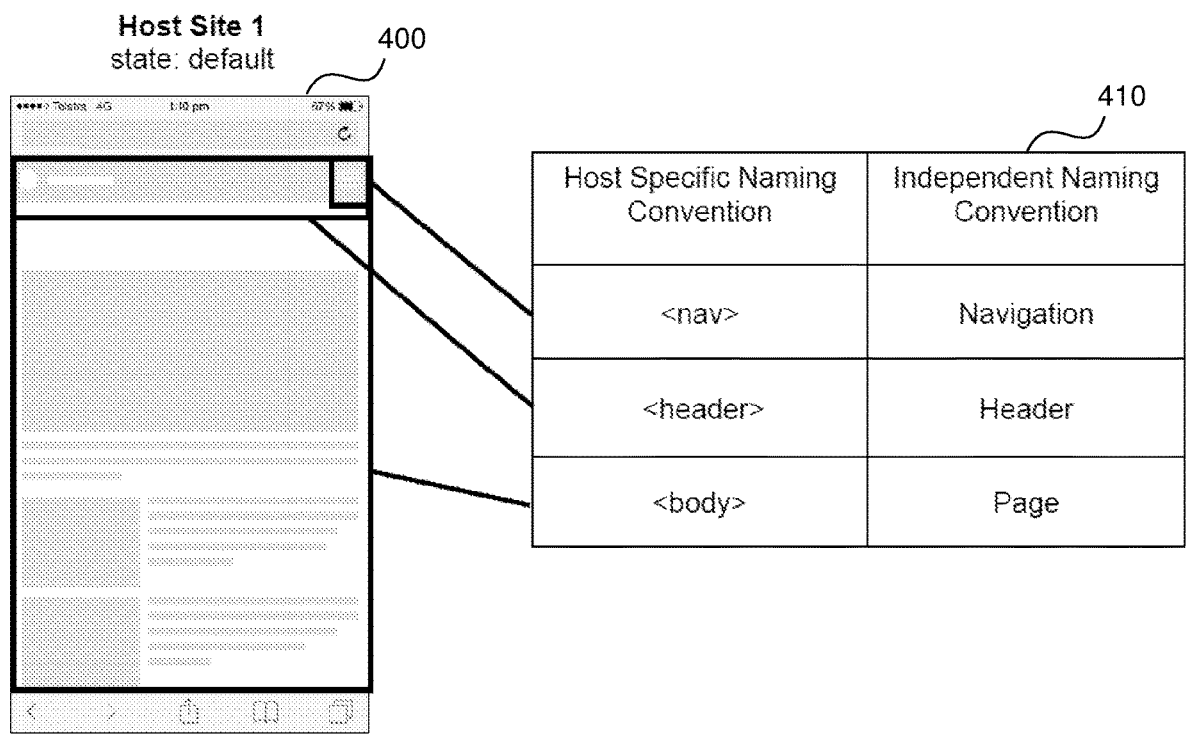
FIGS. 4A-E illustrate the result of rendering the code of Host Sites 1, 2, and 3 from the examples of FIGS. 1A-C in a mobile web browser and the differing visual appearance in each representational state.
Figure 4B:
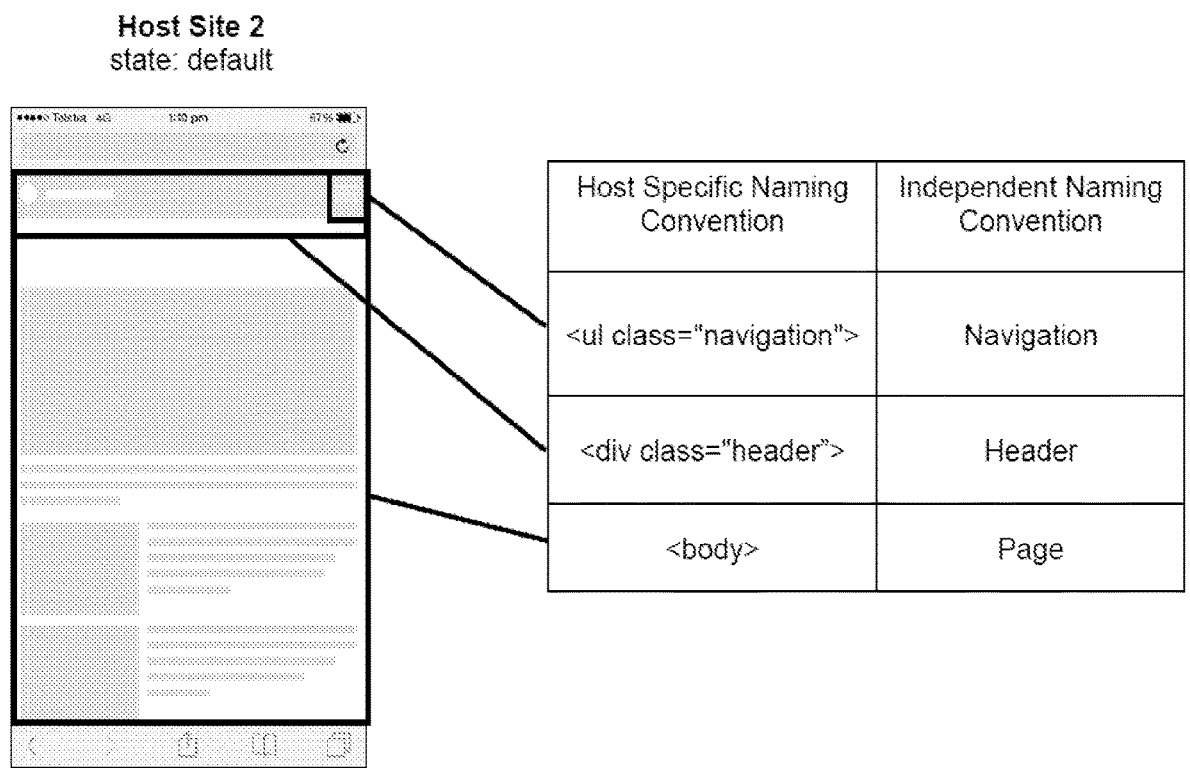
Figure 4C:
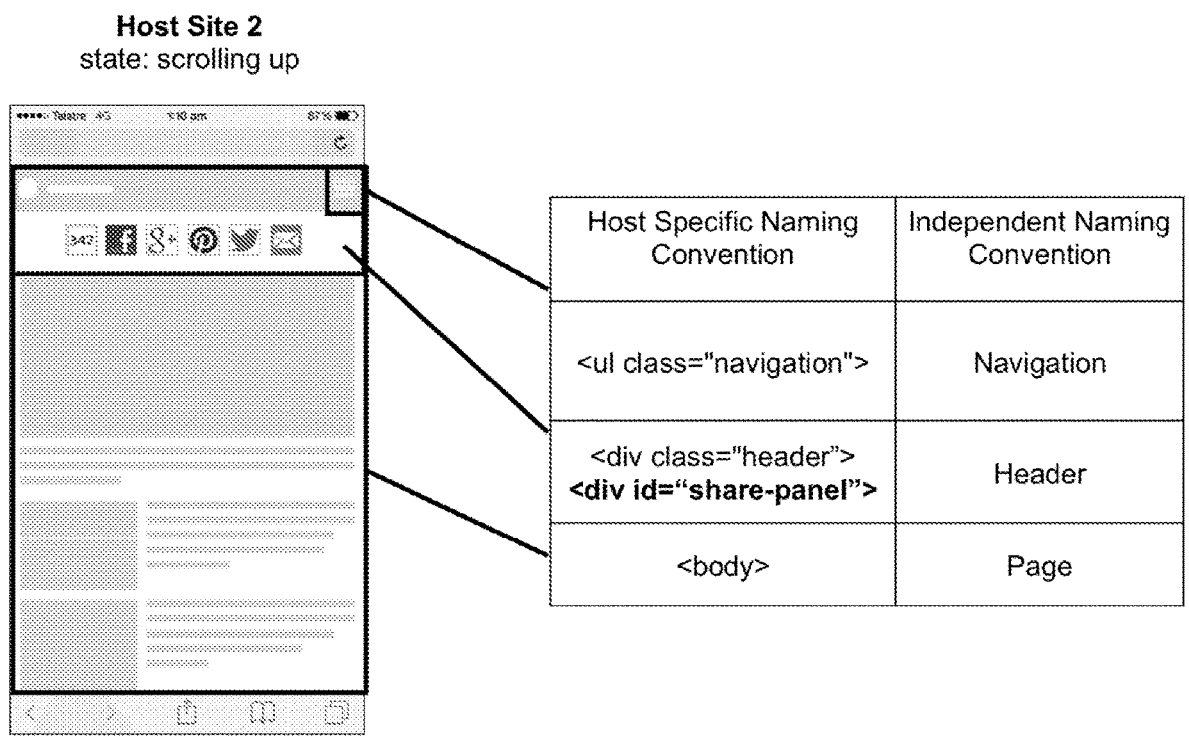
Figure 4D:
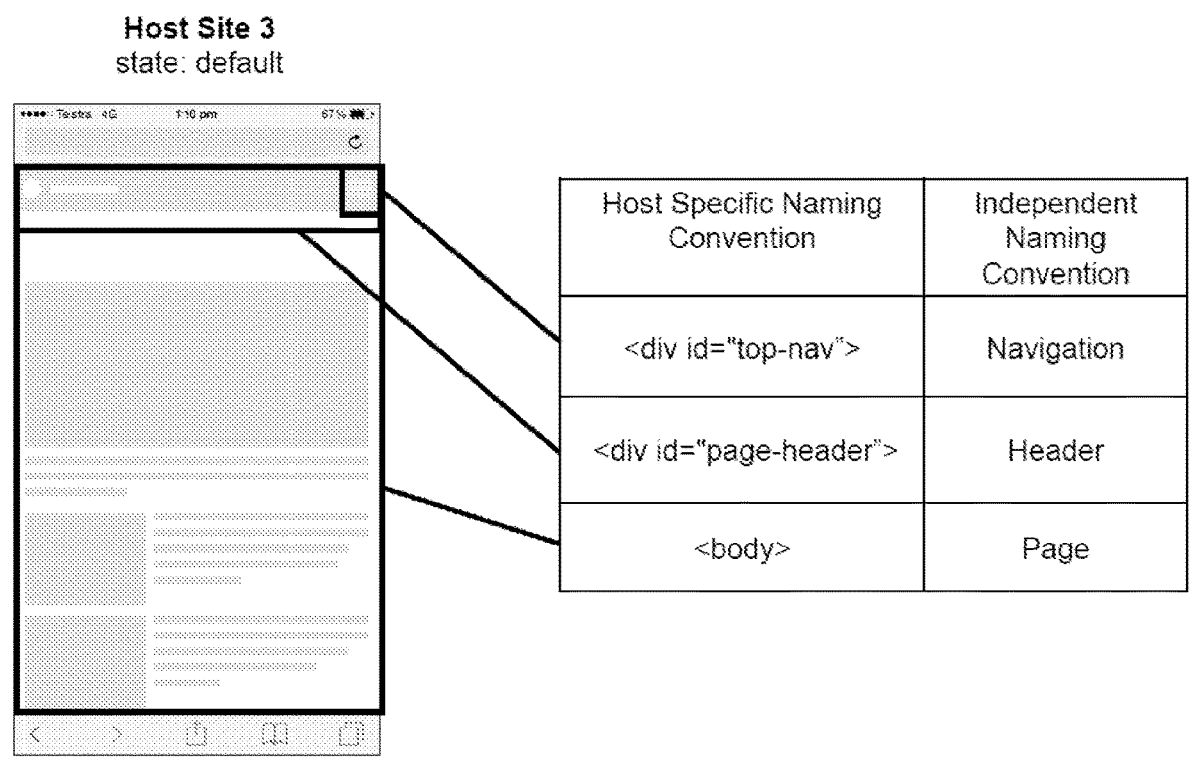
Figure 4E:
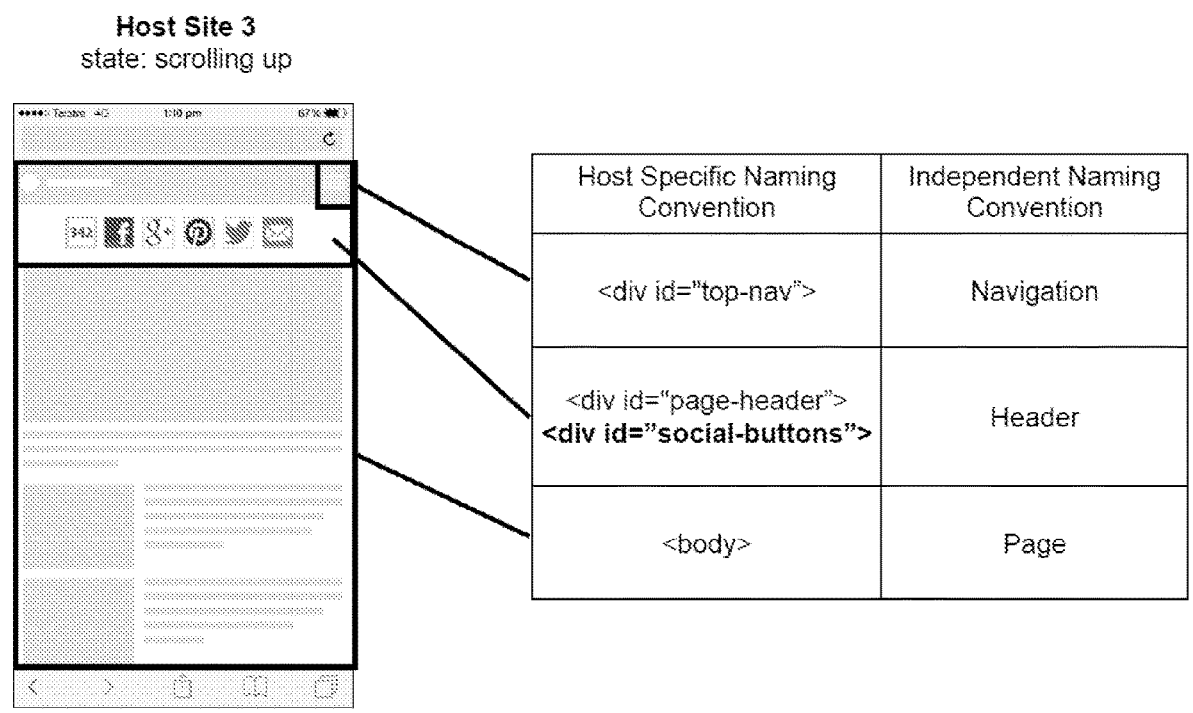

FIGS. 4A-E illustrate the result of rendering the code of Host Sites 1, 2, and 3 from the examples of FIGS. 1A-C in a mobile web browser and the differing visual appearance in each representational state. For example, FIG. 4A illustrates a sample webpage 400 and a set of components 410 in accordance with an independent naming convention, wherein the set of components 410 in this example include "Navigation", "Header" and "Page".

FIG. 2 illustrates a method 200 for distributing electronic publishing content in accordance with the present disclosure. The method 200 begins at step 210, which creates a set of standardised independent naming conventions for components of websites, referred to as a host configuration database of independent naming conventions.

Step 220 analyses a set of chosen sites and identifies the default representational state for each site. During a user's visit to a Site, the state of the Site may change between a default representational state and one or more additional representational states. These additional states are identified and described in terms of one or more conditional statements that must hold true for the state to be considered active. These conditional statements are composed using checks or measurements of a set of real time characteristics. The real time characteristics may relate, for example, to one or more of the site, the web browser, information pertaining to the user visiting the site or some third party data source, including, but not limited to, the current position of the viewport relative to the webpage document, the current scroll direction (up or down), the time elapsed since the user arrived on the page, the user's interactions with content on the page (e.g., clicking on a menu or interacting with some other dynamic component), whether or not the user has authenticated themselves to the site, the number of previous visits a user has made to a site, or the values from some external data source (e.g., weather information, a sporting result or schedule).

Table 1 below shows some example conditional statements that may be used to describe the prerequisite for a given representational state to be active at a given moment in time. This list is illustrative and non-exhaustive, as there are an infinite number of conditional states that may described for a given host site.

TABLE 1

| Representational state | Conditional statement (pseudo code) | Description |
| --- | --- | --- |
| Default | True if no other state active | The default state of the site when no other conditional states are active |
| User logged in | user.loggedIn == true | The user is authenticated (logged in) to the site |
| Scrolling up | scrollPos < lastScrollPos | The user is currently scrolling upwards |
| Scrolling down | scrollPos > lastScrollPos | The user is currently scrolling downwards |
| First visit | numVisits == 1 | This is the user's first visit to the site |
| Portrait | device.orientation == 'portrait' | The device orientation is currently portrait |
| Landscape | device.orientation == 'landscape' | The device orientation is currently landscape |
| News flash | document.getElementsByClassName('news-flash").length >= 1 | The page is currently displaying a news flash |

Step 230 analyses said host sites and identifies a mapping between components of each host site and the independent component names in the host configuration database for each representational state of the host site.

Control passes to step 240, which creates an electronic advertisement that uses the set of independent naming conventions to reference components of a webpage. Step 250 receives a request for an advertisement from a host site. Step 260 creates a host-site specific version of the advertisement created in step 240 by using the data and mapping stored in the host configuration database. In one implementation, step 260 interrogates the host configuration database to retrieve a mapping of host-specific components against independent components for each representational state and configures the advertisement based on that mapping. Step 270 delivers the host-specific advertisement to the requesting host site, wherein the advertisement now contains a mapping to components in accordance with the host-specific naming conventions of the host page.

Table 2 shows a sample host configuration database. Each row relates to a webpage component and lists any constraints that might apply to that component. A multiplicity field indicates how many instances of a component may exist on any web page.

TABLE 2

| Independent Naming Convention for Webpage Component | Description/Function | Constraints | Multiplicity |
|---|---|---|---|
| page | The ancestor of all visible components on the page. | Must be the ancestor of all other components | 1 |
| header | The topmost component of a page, typically containing the website branding logo. | | 0 . . . 1 |
| header-anchored | As per header, but configured to be anchored to the top of the viewport. | | 0 . . . 1 |
| menu | A component that, when clicked, reveals a list of one or more site navigation options. | | 0 . . . 1 |
| datestamp | A component that contains the current date and/or time. | | 0 . . . * |
| weather | A component that displays weather information. The weather information may be specific to the user's location or some other pre-defined location. | | 0 . . . * |
| navigation | A component that contains one or more site navigation hyperlink. | | 0 . . . * |
| navigation-item | A hyperlink contained within a navigation component. | Child of navigation. | 0 . . . * |
| content | A component that contains the content proper. Typically, this component contains one or more articles, ad space, etc | Child of page. | 1 . . . * |
| hero | A component that contains featured content on a page, typically a large image accompanied with byline and body. | Child of content. | 0 . . . * |
| hero-image | The primary image contained within a hero element. | Child of hero. | 0 . . . 1 |
| hero-text | The primary text contained within a hero element. | Child of hero. | 0 . . . 1 |
| adspace | A component that contains advertising content. | | 0 . . . * |
| video-player | A component that allows the playback of video content. | Child of content. | 0 . . . * |
| article | A component that wraps a related set of content, e.g., a single news article, with images and text, or a written blog post with article and text. | Child of content. | 0 . . . * |
| article-title | The title text for an article. | Child of article. | 0 . . . 1 per article |
| article-image | An image that accompanies an article. | Child of article. | 0 . . . * per article |
| article-copy | The textual content of an article. | Child of article. | 1 . . . * per article |
| footer | The page footer, typically containing a copyright notice and/or hyperlinks to other site content. | | 0 . . . 1 |
| footer-anchored | As per footer, but anchored to the bottom of the viewport. | | 0 . . . 1 |

The host configuration database may evolve and adapt over time, depending on the particular application. As such, new webpage components may be introduced and existing webpage components may be modified or deleted.

The method of the present disclosure establishes mappings between the standardised components of the independent naming convention and host-specific naming conventions used for webpage components in a set of host sites and their representational states. That is, the host configuration database stores a mapping across a set of host sites and their representational states to the independent naming convention of the host configuration database.

The examples of FIGS. 1A-C showed three different implementations of code that are functionally equivalent. FIGS. 3A-E highlight the mapping of different component names from each of Host Site 1, Host Site 2, and Host Site 3 to the independent naming convention of the host configuration database of Table 2. Site 1 exhibits only a single representational state, whereas Sites 2 and 3 exhibit multiple representational states, namely their "default" state and "scrolling up" state.

FIG. 3A shows the code of Host Site 1 in its default representational state, with the following mappings identified:

| | | |
|---|---|---|
| <body> | → | Page |
| <header> | → | Header |
| <nav> | → | Navigation. |

FIG. 3B shows the code of Host Site 2 in its default representational state, with the following mappings identified:

| | | |
|---|---|---|
| <body> | → | Page |
| <div class="header"> | → | Header |
| <ul class="navigation"> | → | Navigation. |
| <div id="share-panel"> | | |

FIG. 3C shows the code of Host Site 2 in its "scrolling up" representational state, with the following mappings identified:

| | | |
|---|---|---|
| <body> | → | Page |
| <div class="header"> | → | Header |
| <ul class="navigation"> | → | Navigation. |
| <div id="share-panel"> | → | Header |

FIG. 3D shows the code of Host Site 3 in its default representational state, with the following mappings identified:

| | | |
|---|---|---|
| <body> | → | Page |
| <div id="page-header"> | → | Header |
| <div id="top-nav"> | → | Navigation. |
| <div id="social-buttons"></div> | | |

FIG. 3E shows the code of Host Site 3 in its "scrolling up" representational state, with the following mappings identified:

| | | |
|---|---|---|
| <body> | → | Page |
| <div id="page-header"> | → | Header |
| <div id="top-nav"> | → | Navigation |
| <div id="social-buttons"></div> | → | Header |

Table 3 shows a portion of the host configuration database of Table 2, updated to reflect the mappings for Host Site 1, Host Site 2, and Host Site 3.

TABLE 3

| Independent Naming Convention for Webpage Component | Description/ Function | Constraints | Multiplicity | Mapping to Host Site 1 on a mobile device | Mapping to Host Site 2 on a mobile device | Mapping to Host Site 2 on a mobile device | Mapping to Host Site 3 on a mobile device | Mapping to Host Site 3 on a mobile device |
|---|---|---|---|---|---|---|---|---|
| Representational State | | | | default | default | scrolling up | default | scrolling up |
| Conditional Statement | | | | — | — | scroll position < last scroll position | — | scroll position < last scroll position |
| page | The ancestor of all visible components on the page. | Must be the ancestor of all other components | 1 | <body> | <body> | <body> | <body> | <body> |
| header | The topmost component of a page, typically containing the website branding logo. | | 0 . . . 1 | <header> | <div class = "header"> </div> | <div class = "header"> <div id = "share-panel"> | <div id = "page-header"> | <div id = "page-header"> <div id = "social-buttons" |
| navigation | A component that contains one or more site navigation hyperlink. | | 0 . . . 1 | <nav> | <ul class = "navigation"> | <ul class = "navigation"> | <div id = "top-nav"> | <div id = "top-nav"> |

A website may have different coding for different devices on which the website is to be displayed. Consequently, the host configuration database optionally includes mappings from the independent naming convention to a host site for a particular device. In the example of Table 3, for example, the code for each of Host Site 1, Host Site 2, and Host Site 3 is for display on a mobile computing device, such as a smartphone, tablet, phablet, or the like. In situations in which a website has the same code for display across different devices, there is no need to have a device-specific mapping for that website. In contrast, a website that has different code for desktop devices and mobile devices may have two different mappings stored in the host configuration database. This is illustrated in Table 4, below, which shows extra columns in the host configuration database of Table 3 for Host Site 4 when displayed in a web browser and for a mobile device.

TABLE 4

| Independent Naming Convention for Webpage Component | ≠ ≠ | Mapping to Host Site 1 on a mobile device | Mapping to Host Site 2 on a mobile device | Mapping to Host Site 3 on a mobile device | Mapping to Host Site 4 on desktop device | Mapping to Host Site 4 on mobile device |
| --- | --- | --- | --- | --- | --- | --- |

Web advertisements are generally created as HTML documents. Typical advertisements are designed to appear within a specific region or "container" of a host site. Such advertisements usually do not seek to reference, modify, or interact with components of host site outside the container, despite it being possible for advertisements to do so. The components may include, for example, the page header, the navigation menu, the first article on the page, the title text of the articles on the page, and the like.

In order for an advertisement to interact with components of a host site, the code of the advertisement needs to reference the components on the host page with which the advertisement wants to interact. This requires specific knowledge of the host page and its specific naming conventions for components on that host page, otherwise the advertisement will not work reliably and as intended on the host site. Furthermore, as the representation state of a site changes during the user's visit, additional specific knowledge of these states is required for each host page. In practice, this effectively means that to reference webpage components on a host page reliably, one advertisement must be constructed for each host page. Alternatively, one advertisement may be constructed for a set of host pages, with specific prior knowledge of each host page being built into the advertisement. Given that advertisements are often required to be delivered on hundreds or even thousands of different host sites, this referencing (and any subsequent use of) the webpage components is generally avoided.

In order to illustrate the difficulty associated with constructing such advertisements, let us consider an example of a simple HTML advertisement that seeks to position its content directly underneath the "Header" component for each of the three example host sites from FIGS. 1A-1C described above.

A first advertisement, Advertisement 1, created for Host Site 1 executes the following code periodically:

$('#advertisement1').css('margin-top',$('header').height);

A second advertisement, Advertisement 2, created for Host Site 2 (which has multiple representational states) executes the following code periodically:

```
$('#advertisement2').css('margin-top',
    $('div.header').height);
if (scrollPos < lastScrollPos) {
    $('#advertisement2').css('margin-top';
    $('div.header, div#share-panel').height);
}
```

A third advertisement, Advertisement 3, created for Host Site 3 (which has multiple representational states) executes the following code periodically:

```
$('#advertisement3').css('margin-top',
    $('div#page-header').height( ));
if (scrollPos < lastScrollPos) {
```

-continued

```
$('#advertisement3').css('margin-top',
    $('div#page-header, div#social-buttons').height( ));
}.
```

As can be seen, each of the Advertisements 1, 2, and 3 is different in order to reference the webpage components of Host Sites 1, 2, and 3 correctly.

In contrast to this labour-intensive approach, the method and system of the present disclosure provide a framework whereby a single advertisement can be created that references and uses component names from the independent naming convention stored in the host configuration database. The step of creating such an advertisement corresponds to step 240 of FIG. 2, described above. An example of an advertisement created in accordance with the independent naming convention of the host configuration database of Tables 2 and 3 is:

$('#advertisement').css('margin-top',hostConfig.get ('header').height( ));

It will be appreciated by a person skilled in the art that the code provided in the examples above relating to Advertisements 1, 2, and 3 is provided for illustrative purposes and that the code to change the position of the advertisement to align underneath the header component may be implemented in many different ways without departing from the spirit and scope of the present disclosure.

Ad serving is a broad term that describes the process of a webpage or application requesting and displaying an advertisement. Typically, a digital advertising campaign will require that one or more advertisements are scheduled to run across one or more host sites, such as publisher websites, apps, and the like. The advertisements ("creatives") are built to predetermined specifications that define the size and characteristics of the advertisements for display on the selected host sites.

Broadly speaking, the process of ad serving involves four systems:

Ad server: a server that receives requests for advertising content, decides which creative to return from a pool of eligible campaigns, then responds with an ad file;

Creative ad server: a server that receives requests for creative files and returns creative files to a web browser;

Web browser: the web browser on a computing device accessed by a user; and

Web server: the publisher site's web server, which responds to requests for the site content.

Figure 5:
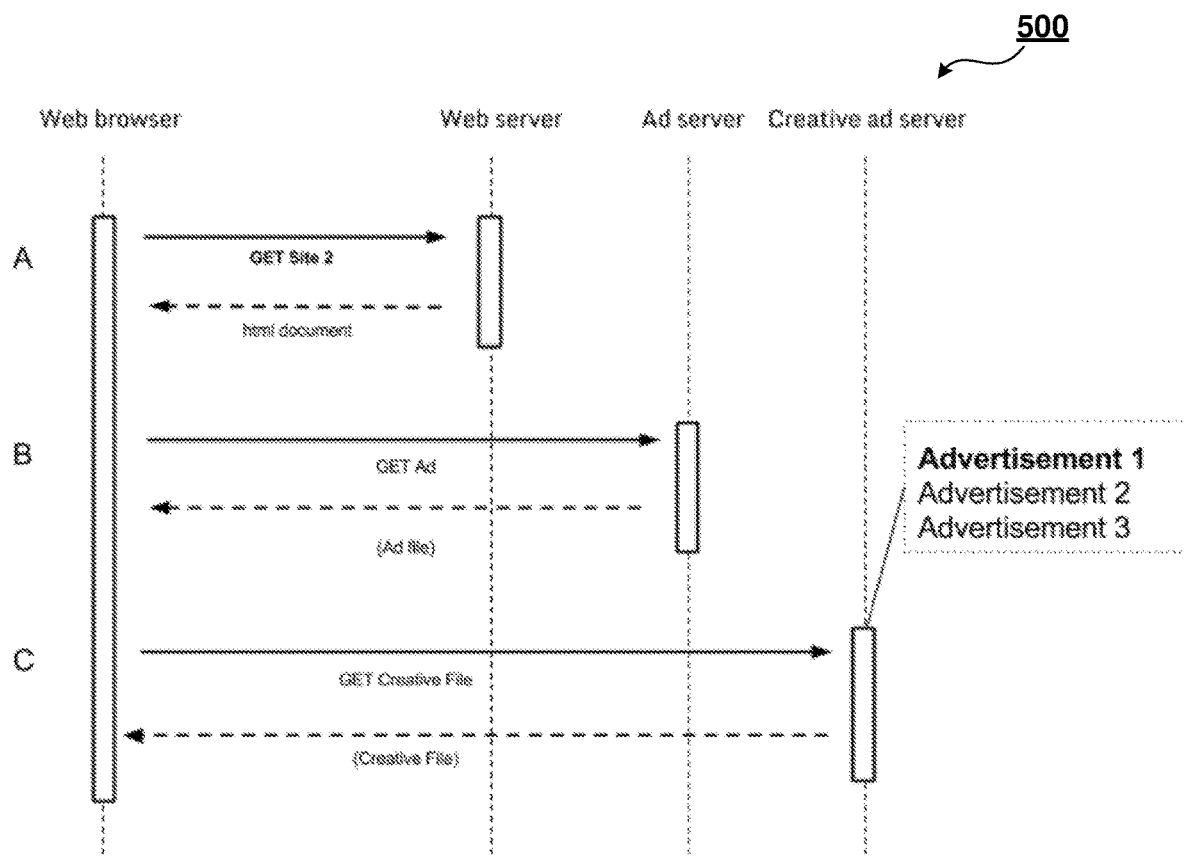
FIG. 5 is a schematic representation of a high level view of an ad serving process.

FIG. 5 is a schematic representation illustrating a typical flow 500 of requests and responses to and from a web browser during an ad serving process, using Host Site 1 from FIG. 1A. In a first step, a web browser sends a request for Site 1 from a web server. The web server responds by returning the requested html document and the web browser renders the returned document.

In this example, the returned document contains a reference to an ad file hosted on an ad server. The web browser sends a request to the ad server for the ad file and the ad server returns the requested ad file.

In this example, the returned ad file contains a reference to creative content to be retrieved from a creative ad server. The web browser sends a request to the creative ad server, which returns a creative file for display by the web browser.

Returning to the earlier example in which first, second, and third advertisements were created to position themselves under the header component for Host Sites 1, 2, and 3, the ad serving process described with reference to FIG. 5 would need to have three different advertisements (Advertisements 1, 2, and 3) stored in the creative ad server for delivery to the respective host sites. Alternatively, the creative ad server would need to store a single advertisement constructed with specific prior knowledge of each of the three host sites (Host Sites 1, 2, and 3). In such an implementation, the creative ad server would need to identify the source of the request, such that:

a. if the request for creative content originated from Host Site 1, deliver the first advertisement;

b. if the request for creative content originated from Host Site 2, deliver the second advertisement, and c. if the request for creative content originated from Host Site 3, deliver the third advertisement.

Figure 6:
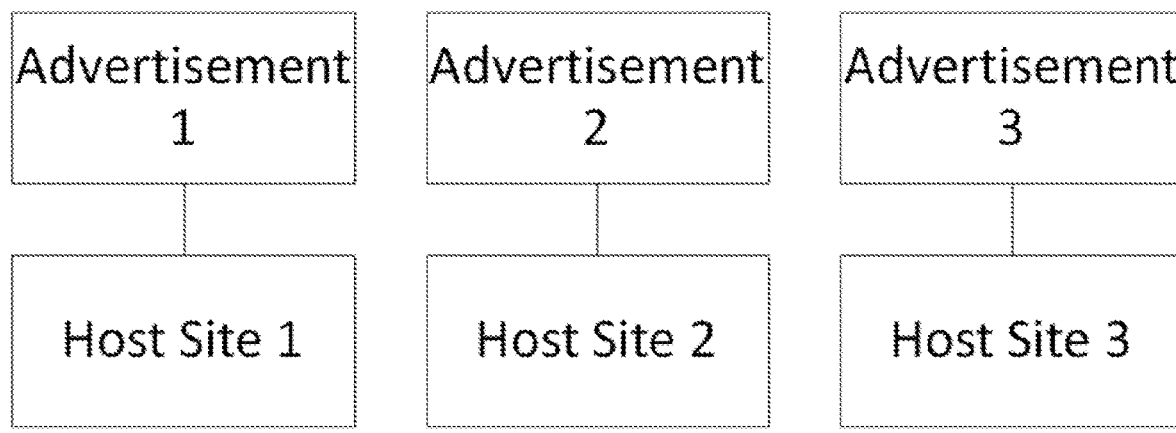
FIG. 6 illustrates ad serving of customised advertisements to each of Host Sites 1, 2, and 3.

This ad serving process, wherein a separate advertisement is constructed for each destination host site, is illustrated in FIG. 6. When separate advertisements are customised for each host site, the ad serving process does not include step 260 of FIG. 2. However, extra costs (time, financial, and resources) are incurred through the creation of separate advertisements for each of the destination host sites (Host Sites 1, 2, and 3).

Figure 8A:
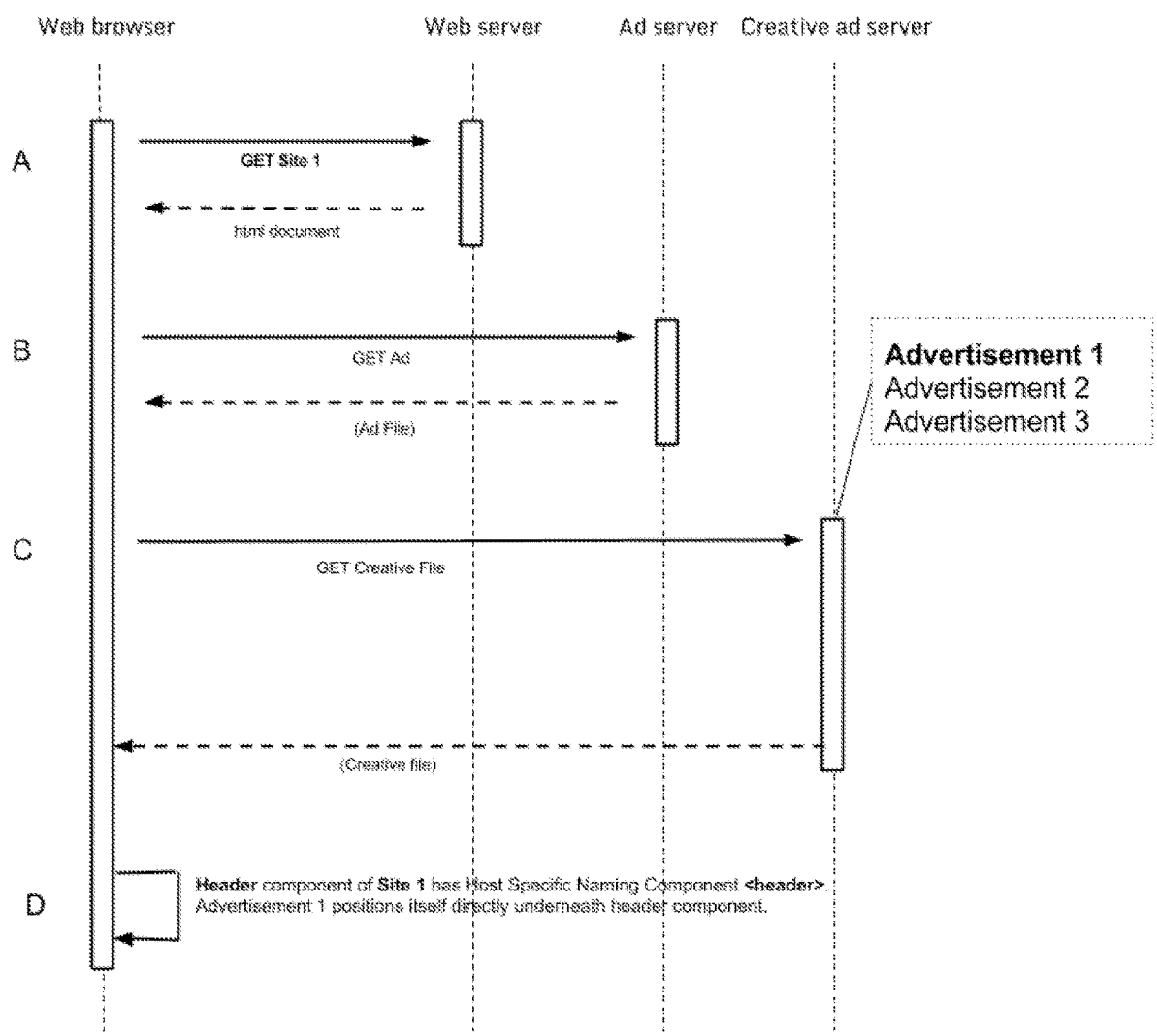
FIGS. 8A-C illustrate delivery of customised advertisements for each of three disparate destination host sites, Host Sites 1, 2, and 3.
Figure 8B:
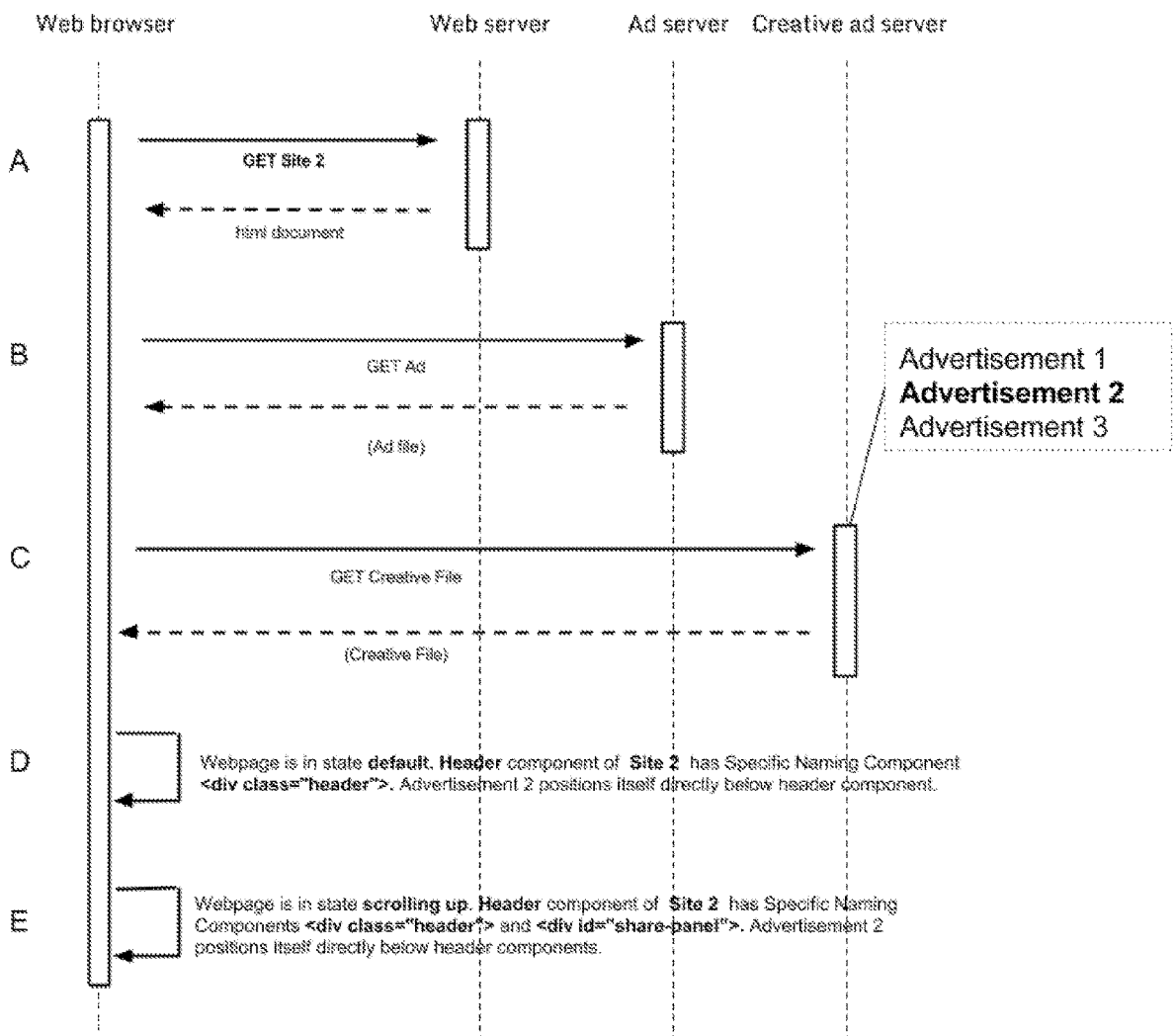
Figure 8C:
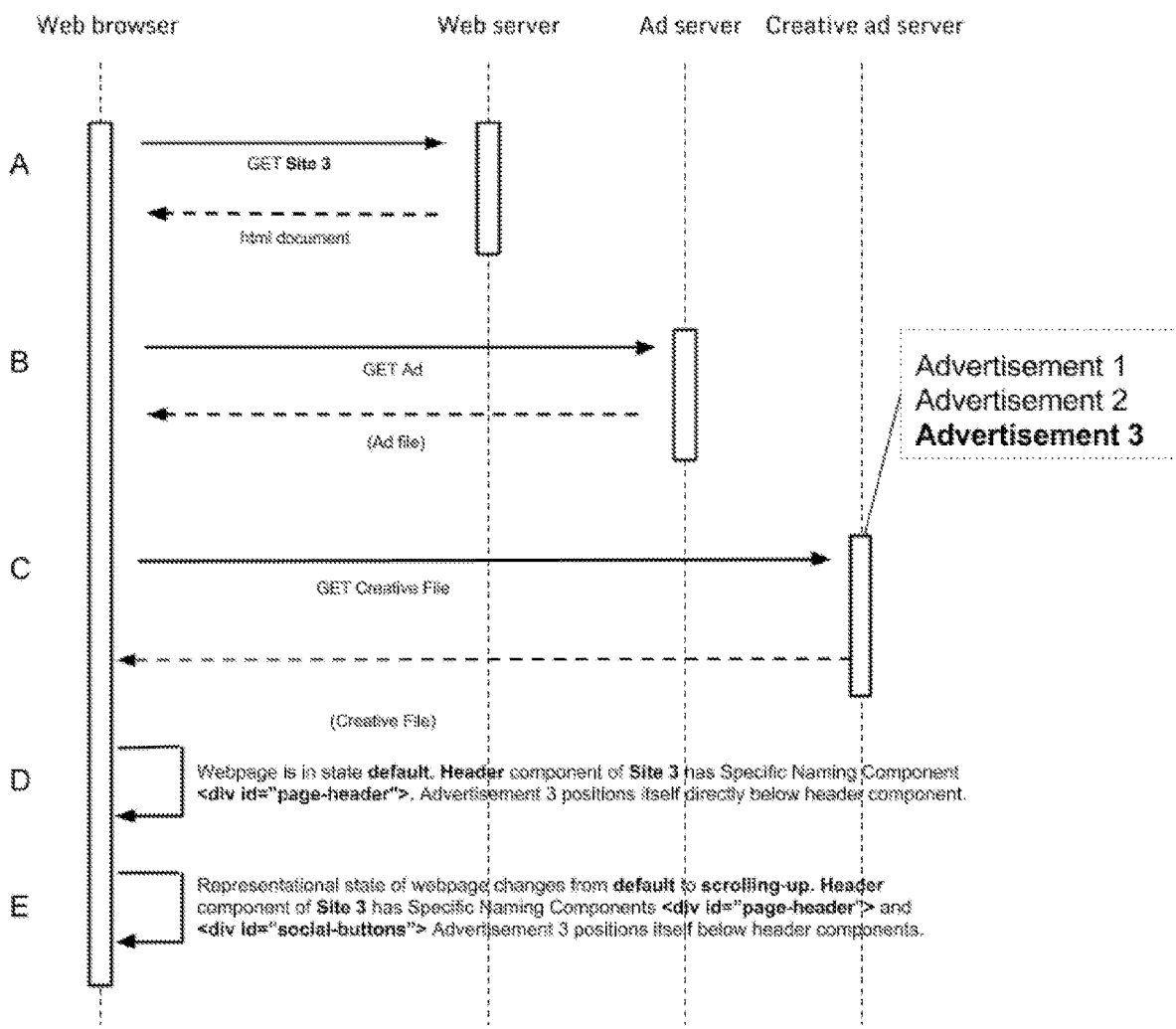

FIGS. 8A-C illustrate delivery of customised advertisements for each of Host Sites 1, 2, and 3, respectively. In FIG. 8A, relating to delivery of an advertisement to Host Site 1, a web browser requests HTML content from Host Site 1 and renders returned content received from a web server. The returned content contains a reference to an ad file hosted on an ad server, so the web browser requests the ad file from the ad server and executes an ad file returned from the ad server. The ad file includes a reference to a creative file, so the web browser requests the creative file from a creative ad server, which returns the requested creative file to the web browser. The web browser executes the creative file and applies desired changes to the web page of Host Site 1. A similar process is followed for Host Site 2 on FIG. 8B and Host Site 3 on FIG. 8C. In each case, the creative ad server needs to store a customised advertisement (Advertisement 1, Advertisement 2, and Advertisement 3) for each of the respective host sites: Host Site 1, Host Site 2, and Host Site 3, or a single advertisement with prior specific knowledge of the host-site specific naming conventions of each of Host Site 1, Host Site 2, and Host Site 3.

In contrast to the ad serving process of FIGS. 5 and 6, the method of the present disclosure includes a request to the host configuration database to map components from a standardised ad using independent naming conventions to host-specific components of an intended host site.

Figure 7:
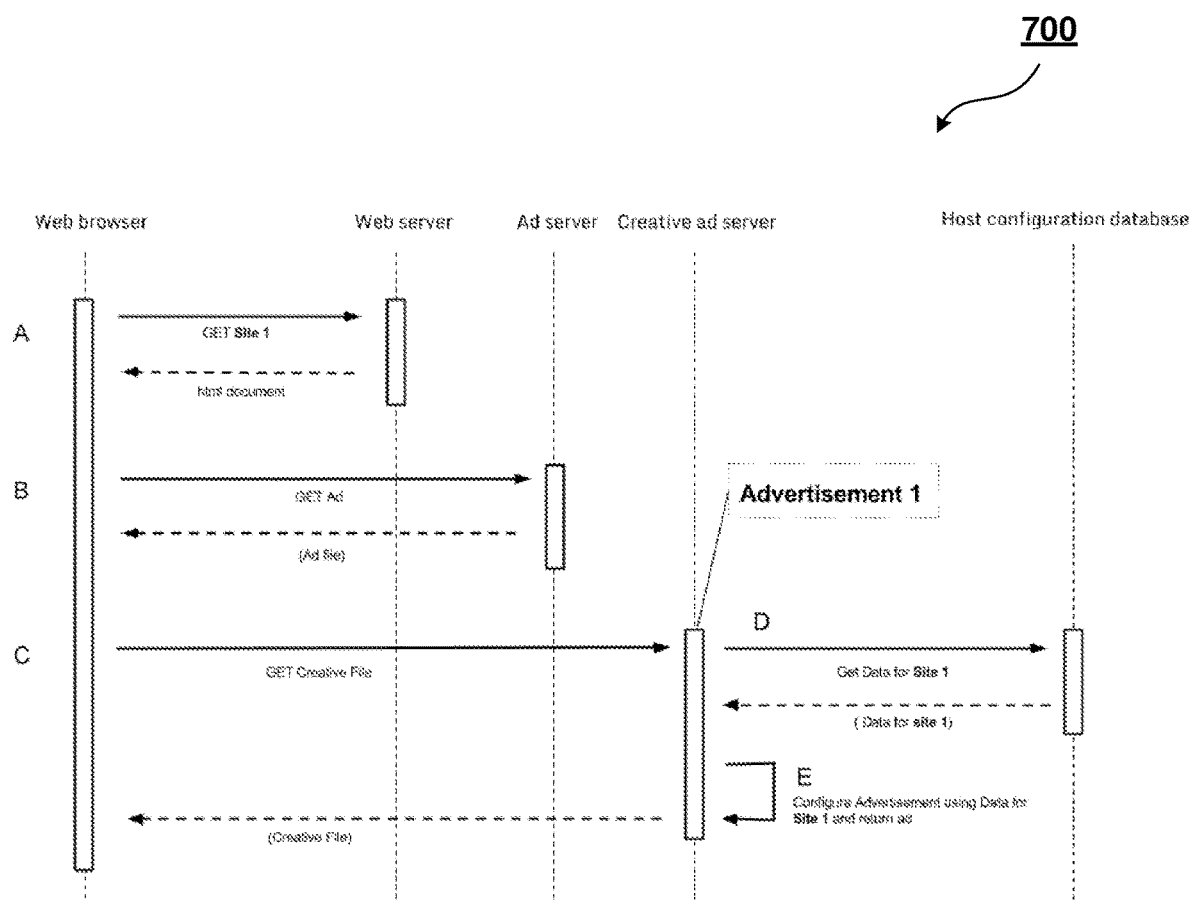
FIG. 7 is a schematic representation of an ad serving process using a host configuration database of the present disclosure.

FIG. 7 is a schematic representation of an ad serving process 700 using a host configuration database of the present disclosure. The ad serving process 700 includes a flow of requests and responses to and from a web browser during an ad serving process, using Host Site 1 from FIG. 1A. In a first step, a web browser sends a request for Site 1 from a web server. The web server responds by returning the requested html document and the web browser renders the returned document.

In this example, the returned document contains a reference to an ad file hosted on an ad server. The web browser sends a request to the ad server for the ad file and the ad server returns the requested ad file.

Figure 14A:
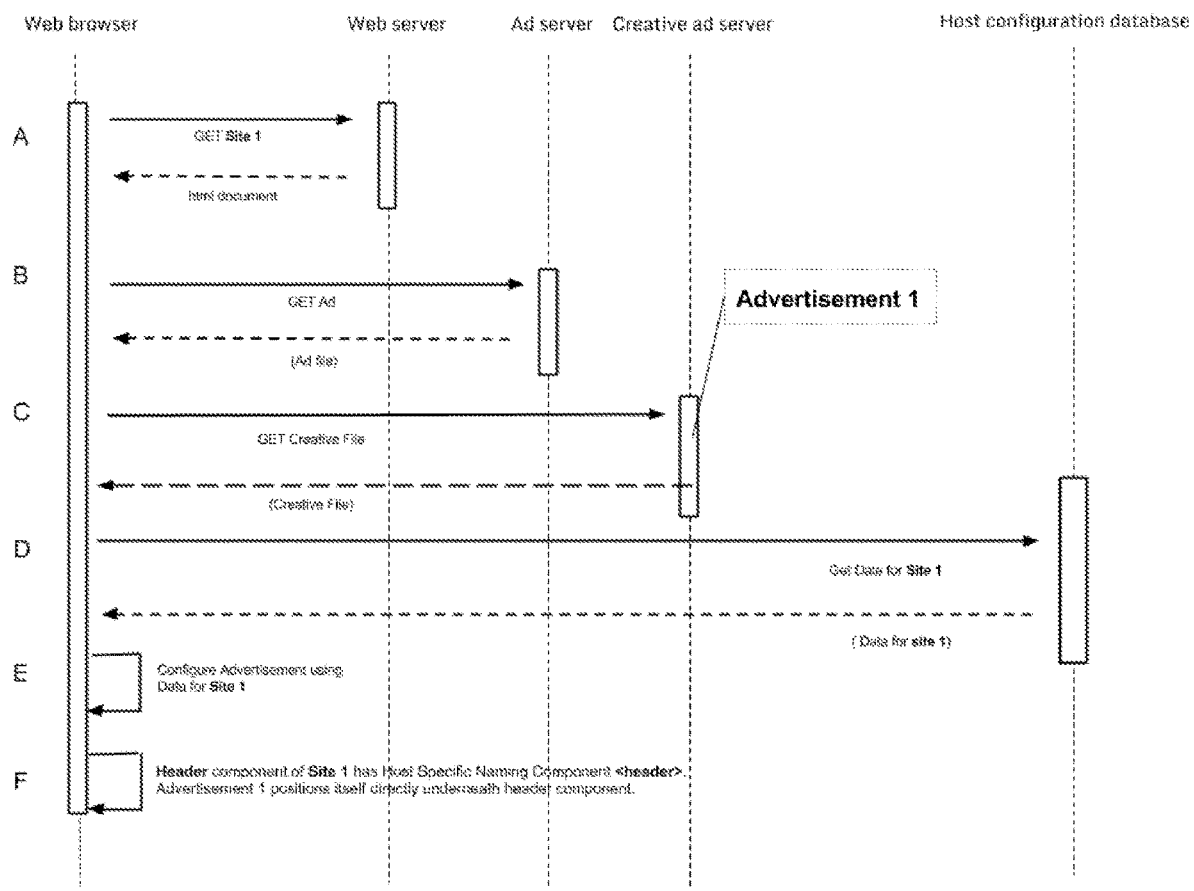
FIGS. 14A-B illustrate an alternative ad serving process in accordance with the present disclosure, when delivering creative content to each of Host Sites 1, 2, and 3, respectively, using a single advertisement.
Figure 14B:
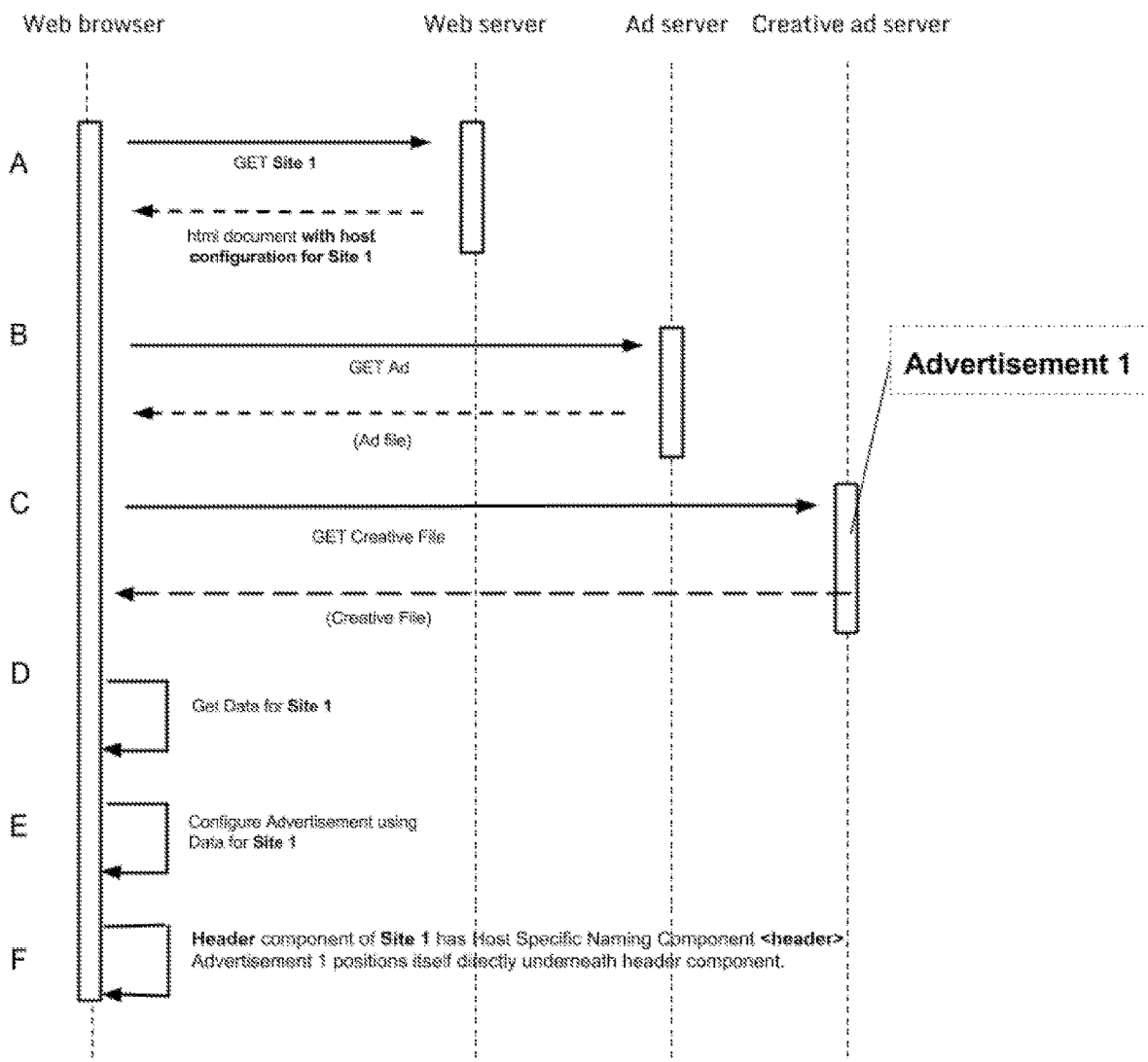

In this example, the returned ad file contains a reference to creative content to be retrieved from a creative ad server. The creative ad server notes that the request originates from Host Site 1 and sends a request to the host configuration database for the mapping relevant to Host Site 1. In one arrangement, the creative ad server is configured to communicate with the host configuration database. In such an arrangement, the creative ad server requests a mapping from the host configuration database for the originating host site from which the request is being made. Consequently, the creative ad server knows to request such a mapping from the host configuration database when the creative ad server receives a request in relation to one of those destination host sites. In another arrangement, such as shown in FIG. 14A, the creative file received by the web browser on the computing device includes an instruction to communicate with the host configuration database and request the required mapping for the relevant host site from the host configuration database. In this arrangement, the creative ad server is not required to communicate with the host configuration database. In yet another arrangement, such as shown in FIG. 14B, the creative file received by the web browser includes an instruction to communicate with the host site in order to obtain the host configuration. In this arrangement, the host site is performing the role of the host configuration database, albeit only for creative files delivered to this site.

The host configuration database returns the mapping between the independent naming convention and Host Site 1 for each of the Host Site 1's representational states. The creative ad server configures or translates a stored advertisement compliant with the independent naming convention in accordance with the mapping for Host Site 1. The creative ad server then transmits the configured advertisement to the web browser for display by the web browser.

The process 700 of FIG. 7 can be applied to deliver creative content for any of Host Site 1, Host Site 2, and Host Site 3, based on the mappings of Table 3 stored in the host configuration database and one or more stored advertisements that are compliant with the independent naming convention.

In contrast to the ad serving processes of FIGS. 8A-C, FIGS. 9A-C illustrate an ad serving process in accordance with the present disclosure, when delivering creative content to each of Host Sites 1, 2, and 3, respectively, using a single advertisement, Advertisement 1, created in compliance with the independent naming convention of the host configuration database of Table 3.

Figure 9A:
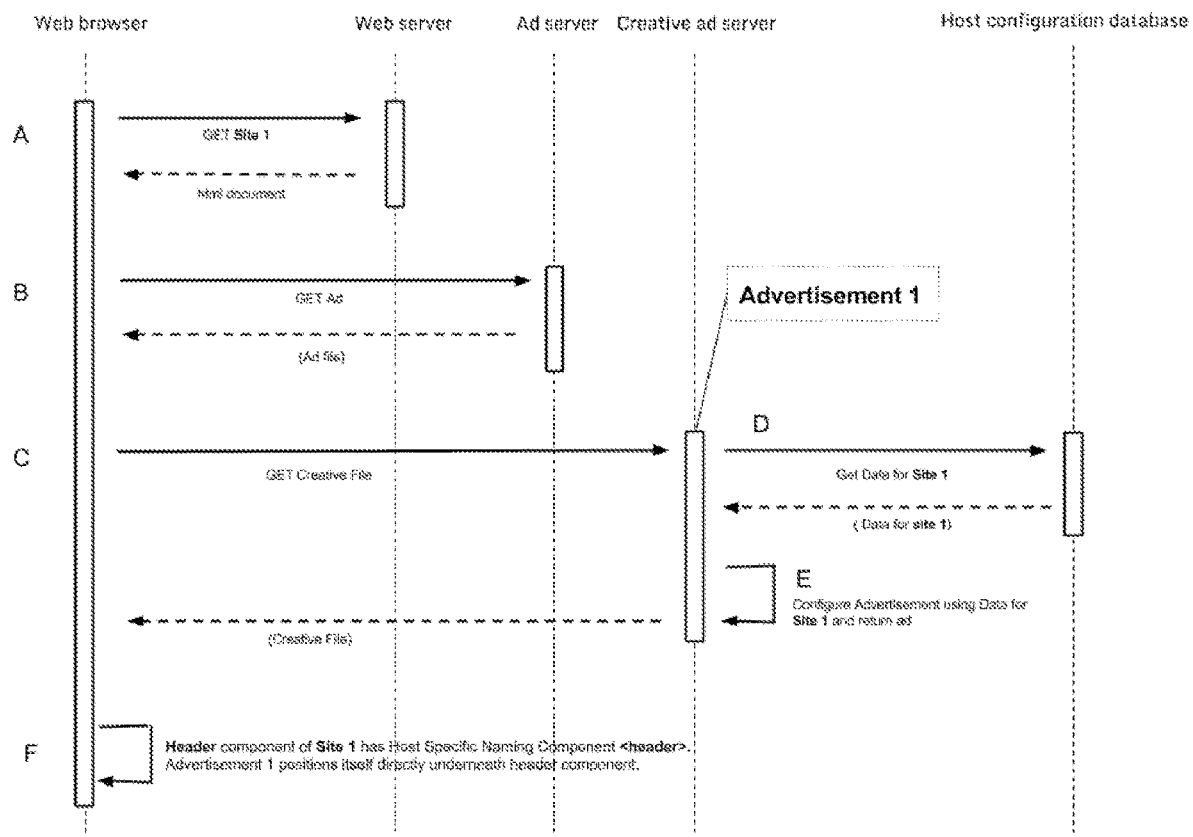
FIGS. 9A-C illustrate an ad serving process in accordance with the present disclosure, when delivering creative content to each of Host Sites 1, 2, and 3, respectively, using a single advertisement.
Figure 9B:
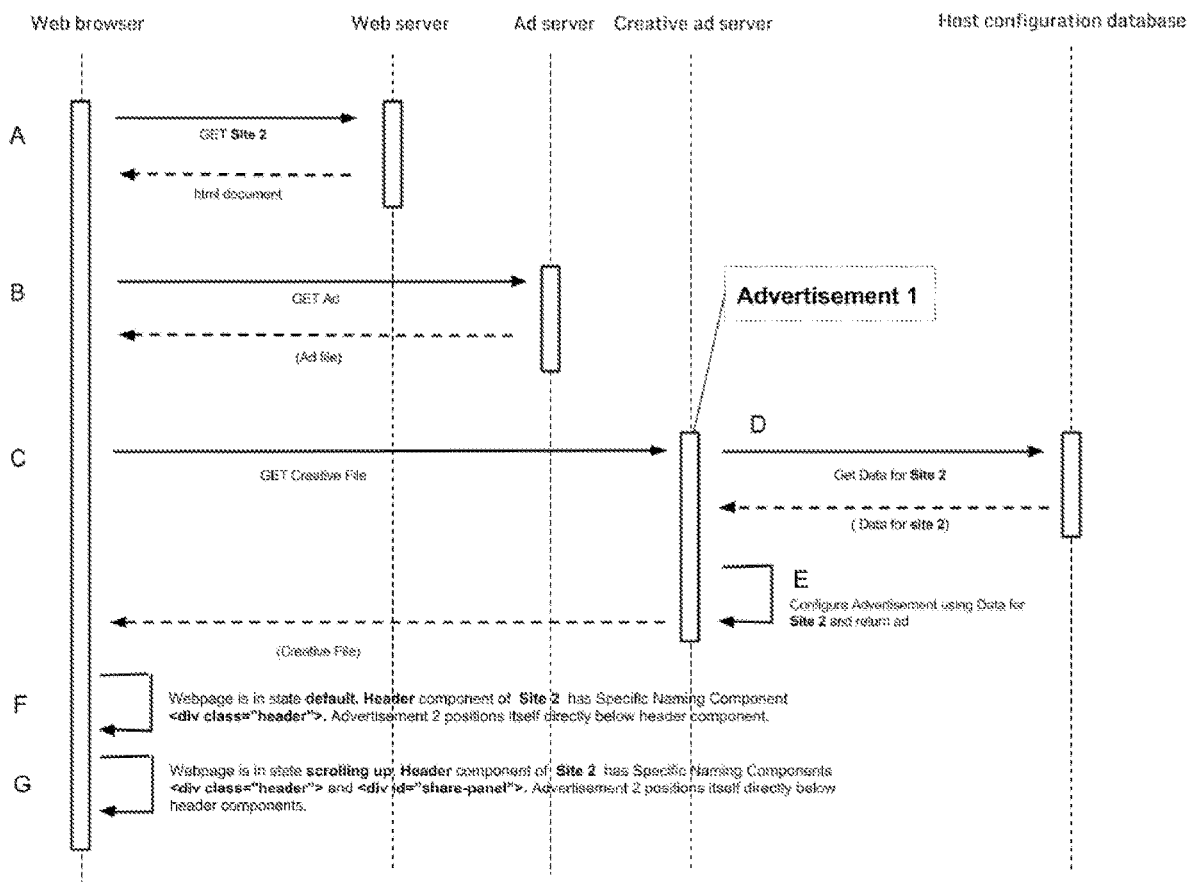
Figure 9C:
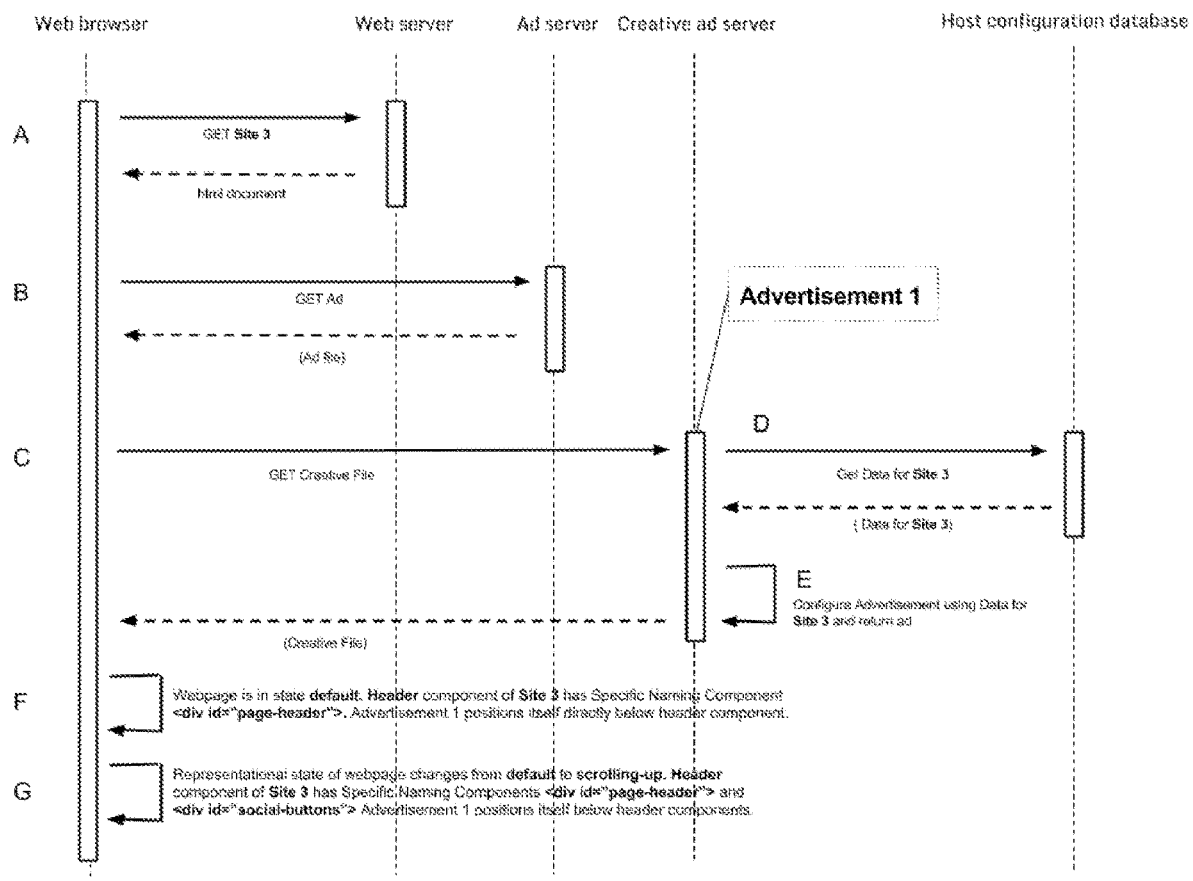

The ad serving process of FIGS. 9A-C is the same as that illustrated in FIG. 7. FIG. 9A illustrates an ad serving process in relation to Host Site 1. A creative ad server stores a single advertisement, Advertisement 1. When the creative ad server receives a request from the web browser for a creative file, the creative ad server identifies that the request is associated with Host Site 1 and sends a request to the host configuration database for a host configuration pertaining to Host Site 1. The creative ad server configures the stored advertisement, Advertisement 1, for Host Site 1, based on the returned host configuration pertaining to Host Site 1. The creative ad server then returns the configured creative file to the web browser. The web browser executes the configured creative file, which interacts predictably and reliably with components of Host Site 1.

FIGS. 9B and 9C illustrate a similar process repeated in respect of Host Sites 2 and 3, respectively, using the same advertisement, Advertisement 1, stored in the creative ad server. Thus, a single advertisement using an independent naming convention can be dynamically configured during the ad serving process for different destination host sites and their representational states, wherein the dynamic configuration is performed in accordance with a stored mapping of host configurations in a host configuration database.

In one arrangement, the creative ad server and the host configuration database are separate entities in communication with each other via a communications network. The communications network may be implemented using one or more wired or wireless transmission links and may include, for example, a cellular telephony network, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a cellular (mobile) telephone cellular network, a short message service (SMS) network, or any combination thereof.

In an alternative arrangement, such as shown in FIG. 14A, the creative ad server and the host configuration database are co-located and/or integral with one another, forming a single system.

In yet another arrangement, such as shown in FIG. 14B, the host configuration database is stored on the host web server.

The examples of FIG. 7 and FIGS. 9A-C illustrate a creative ad server making a request to the host configuration database in order to configure a stored advertisement for delivery to a host site. It will be appreciated by a person skilled in the art that other flows may equally be practised, without departing from the spirit and scope of the present disclosure, and that the host configuration database of the present disclosure is adapted to transmit the mapping associated with a destination host site to any requesting source. The requesting source may be, for example, but is not limited to, a creative ad server, an ad server, or a web browser.

For example, FIG. 14A illustrates an alternative implementation in which the creative ad server delivers requested creative content to the web browser, wherein the creative content includes a request to the host configuration database for the host configuration or mapping to be applied for the destination host site. The host configuration database returns the host configuration for the destination host site directly to the web browser, rather than to the creative ad server (as depicted in FIG. 7 and FIGS. 9A-C), so that the web browser performs the configuration of the creative content for the particular destination host site.

In another example, FIG. 14B illustrates an alternative implementation in which the host site delivers the host configuration data to the web browser on the initial request. The creative content includes code to read the host configuration directly from the host page, rather than an external host configuration database providing the host configuration.

Figure 10:
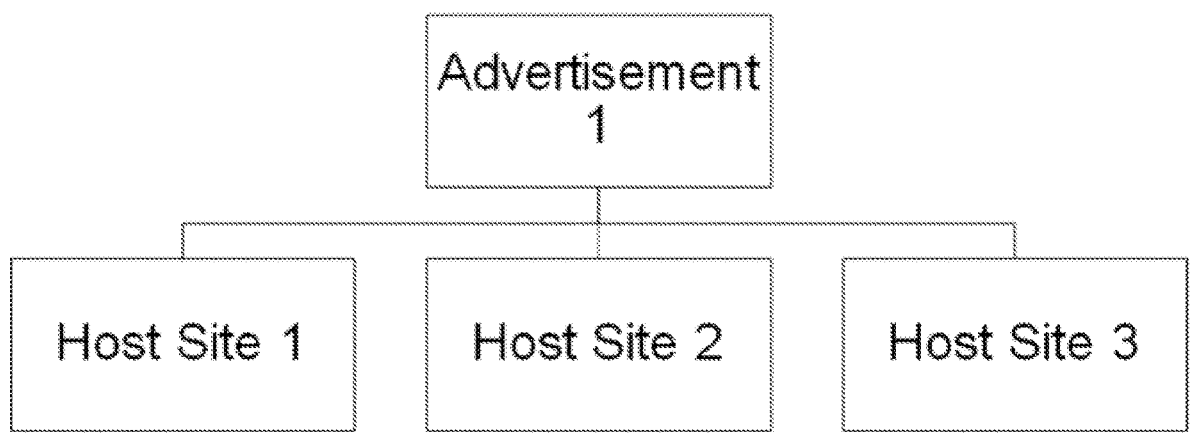
FIG. 10 illustrates the distribution of a single advertisement to multiple destination host sites, as enabled by the method of the present disclosure, despite different naming conventions existing on each of the destination host sites.

FIG. 10 illustrates the distribution of a single advertisement to multiple destination host sites, as enabled by the method of the present disclosure, despite different host-specific naming conventions being present on each of the destination host sites.

The above examples largely relate to scenarios in which ad content detects and reacts to changes in the representational state of a host page. In other examples, the ad content is able to detect, react, modify, and interact with host pages in different ways, dependent on the representational state of the respective host page at a given time.

In one example, an ad detects a header component of a host page across a set of representational states that are valid for that host page. In each representational state, the ad modifies the header component such that the header component has a predefined colour (e.g., red).

In another example, an ad detects all components of a host page in each representational state, with the exception of the header component, and pushes the detected components partially to one side of a display region while filling the remainder of the display region with ad content.

In yet another example, an ad detects that the current representational state of the host page indicates the user is not logged in and applies a visual technique to blur the page article content.

It will be appreciated by a person skilled in the art that the above examples are illustrative and are not exhaustive and that the method and system of the present disclosure may have many applications.

Figure 11:
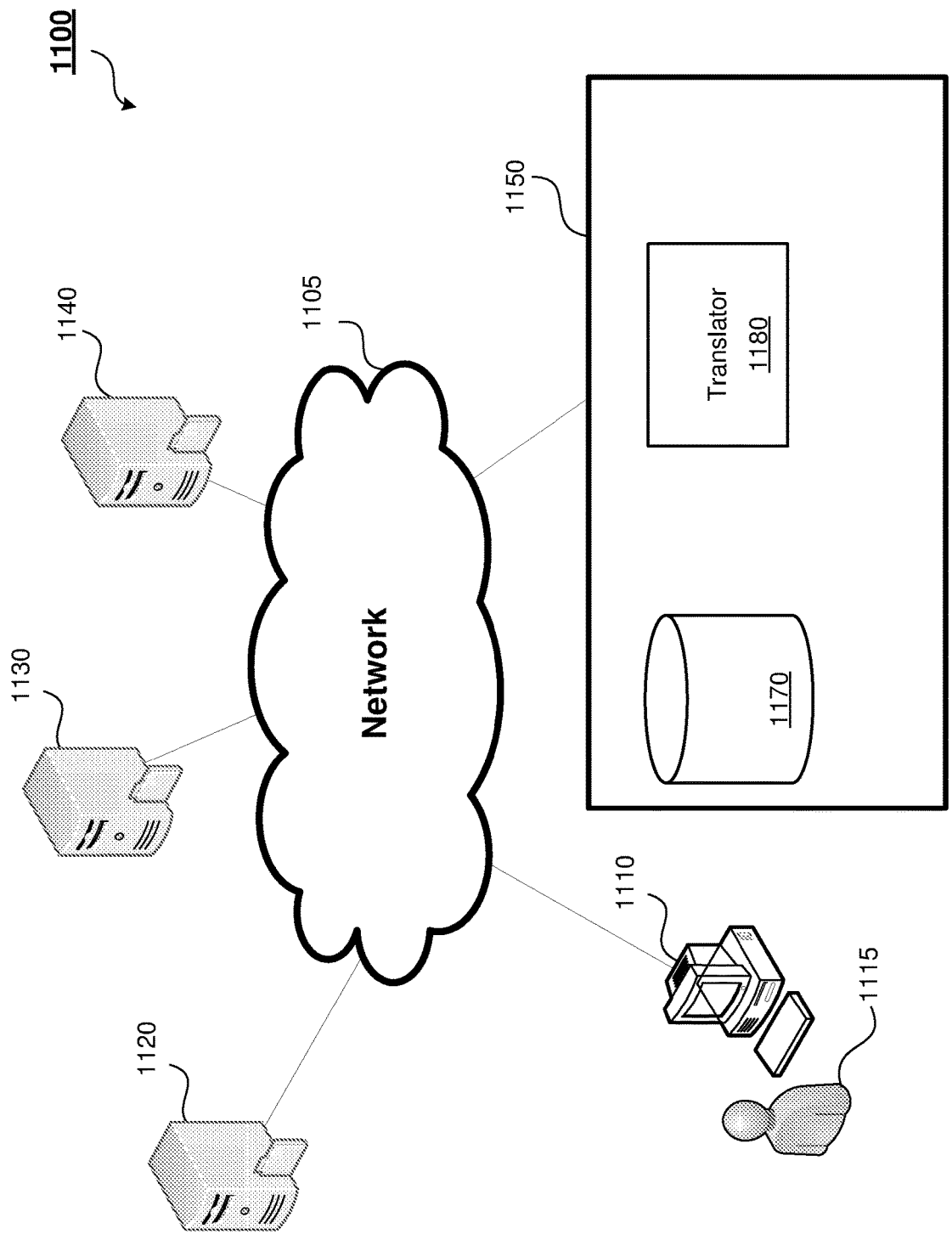
FIG. 11 is a schematic representation of a system on which one or more embodiments of the present disclosure may be practised.

FIG. 11 is a schematic block diagram representation of a system 1100 on which an embodiment of the present disclosure may be practised. The system 1100 includes a communications network 1105 for enabling communication among different components of the system 1100. The communications network 1105 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof.

The system 1100 also includes a host configuration database 1150, which includes a database 1170 and a translator 1180. The database 1170 stores a table of independent component names and the translator 1180 stores mappings from those component names to corresponding host-specific naming conventions used by a set of host destinations, which may be web pages, applications, or the like. In one implementation, the database 1170 and translator 1180 are integrated as a single table, or the like.

A user 1115 accesses a computing device 1110, such as a personal computer, laptop, smartphone, or the like, to browse information from a destination host web page hosted by a web server 1120. The web browser requests a page from the web server 1120 and the web server 1120 transmits the requested page as HTML content for display by the browser on a display device of the computing device 1110.

The requested page includes embedded advertising content to be sourced from an ad server 1130. The web browser transmits a request to the ad server 1130 to deliver the relevant ad file. In this instance, the ad server 1130 delivers the requested ad file to the web browser. The ad file includes a call for creative content, so the web browser transmits a further request, this time to a creative ad server 1140. The creative ad server 1140 receives the request and determines that translation of the creative content is required for the intended host web site. In one arrangement, the creative ad server 1140 is configured to communicate with the host configuration database 1150 to provide mappings on request for a set of destination host sites. In an alternative arrangement, the creative file received by the web browser on the computing device 1110 includes an instruction to communicate with the host configuration database 1150 and request the required mapping for the relevant host site.

The creative ad server 1140 sends a mapping request to the host configuration database 1150 to provide a mapping for the destination host web page. The translator 1180 receives the request and retrieves the relevant mapping from the database 1170. The host configuration database 1150 returns the mapping to the creative ad server 1140, which applies the mapping to translate one or more component names. The creative ad server 1140 then returns a creative file customised for the host web page to the web browser executing on the computing device 1110. The web browser executes the creative file to display the required advertising content and/or effect.

In an alternative arrangement, the creative ad server 1140 responds to a request from the web browser by delivering a creative file to the web browser. When executed on the web browser, the creative file includes a call to the host configuration database 1150 to configure the creative content for the destination host web page being browsed by the user 1115.

Figure 12:
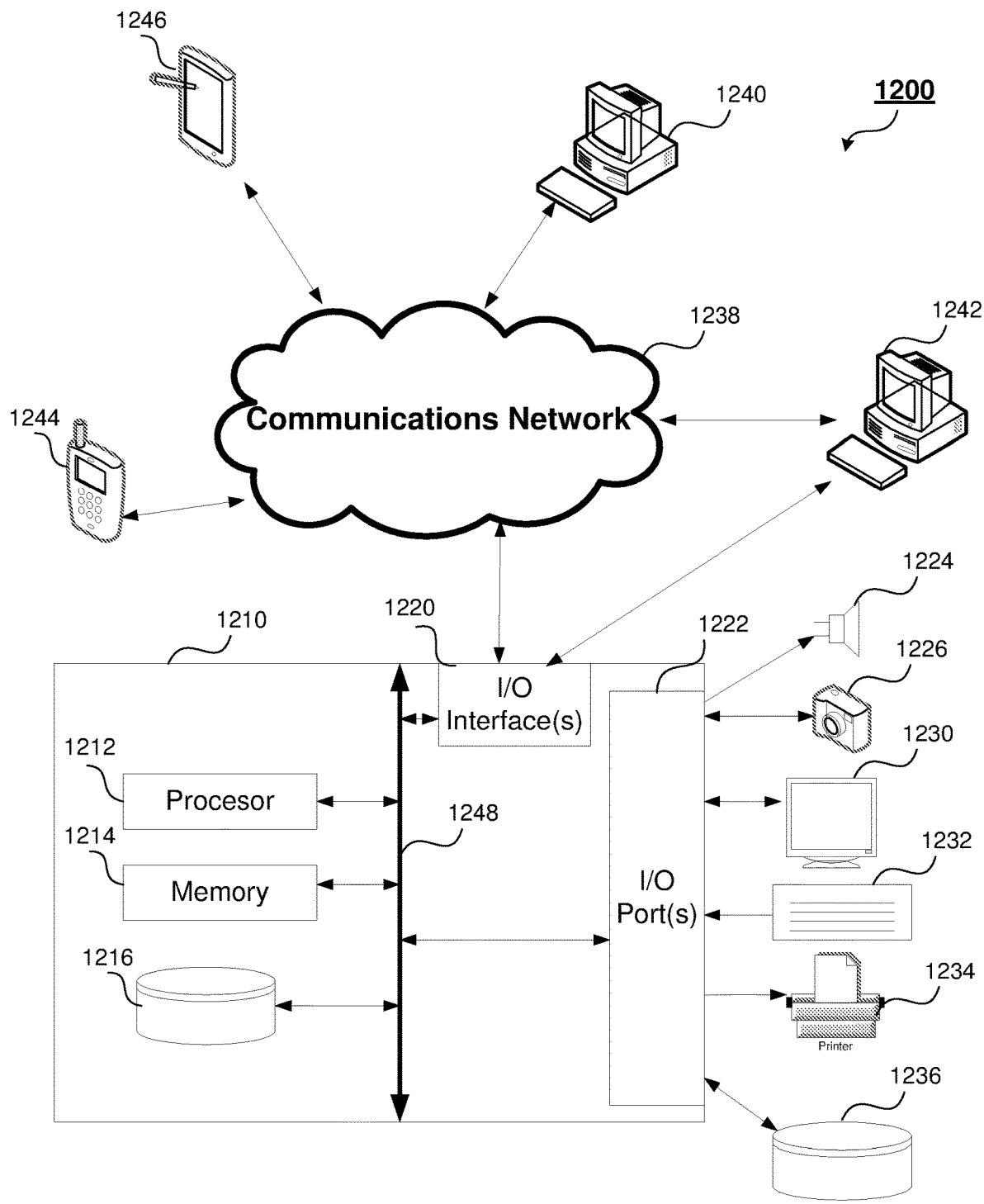
FIG. 12 is a schematic block diagram representation of a system that includes a general purpose computer on which one or more embodiments of the present disclosure may be practised.

The advertising distribution system of the present disclosure may be practised using a computing device, such as a general purpose computer or computer server. FIG. 12 is a schematic block diagram of a system 1200 that includes a general purpose computer 1210. The general purpose computer 1210 includes a plurality of components, including: a processor 1212, a memory 1214, a storage medium 1216, input/output (I/O) interfaces 1220, and input/output (I/O) ports 1222. Components of the general purpose computer 1210 generally communicate using one or more buses 1248.

The memory 1214 may be implemented using Random Access Memory (RAM), Read Only Memory (ROM), or a combination thereof. The storage medium 1216 may be implemented as one or more of a hard disk drive, a solid state "flash" drive, an optical disk drive, or other storage means. The storage medium 1216 may be utilised to store one or more computer programs, including an operating system, software applications, and data. In one mode of operation, instructions from one or more computer programs stored in the storage medium 1216 are loaded into the memory 1214 via the bus 1248. Instructions loaded into the memory 1214 are then made available via the bus 1248 or other means for execution by the processor 1212 to implement a mode of operation in accordance with the executed instructions.

One or more peripheral devices may be coupled to the general purpose computer 1210 via the I/O ports 1222. In the example of FIG. 12, the general purpose computer 1210 is coupled to each of a speaker 1224, a camera 1226, a display device 1230, an input device 1232, a printer 1234, and an external storage medium 1236. The speaker 1224 may be implemented using one or more speakers, such as in a stereo or surround sound system.

The camera 1226 may be a webcam, or other still or video digital camera, and may download and upload information to and from the general purpose computer 1210 via the I/O ports 1222, dependent upon the particular implementation. For example, images recorded by the camera 1226 may be uploaded to the storage medium 1216 of the general purpose computer 1210. Similarly, images stored on the storage medium 1216 may be downloaded to a memory or storage medium of the camera 1226. The camera 1226 may include a lens system, a sensor unit, and a recording medium.

The display device 1230 may be a computer monitor, such as a cathode ray tube screen, plasma screen, or liquid crystal display (LCD) screen. The display 1230 may receive information from the computer 1210 in a conventional manner, wherein the information is presented on the display device 1230 for viewing by a user. The display device 1230 may optionally be implemented using a touch screen to enable a user to provide input to the general purpose computer 1210. The touch screen may be, for example, a capacitive touch screen, a resistive touchscreen, a surface acoustic wave touchscreen, or the like.

The input device 1232 may be a keyboard, a mouse, a stylus, drawing tablet, or any combination thereof, for receiving input from a user. The external storage medium 1236 may include an external hard disk drive (HDD), an optical drive, a floppy disk drive, a flash drive, or any combination thereof and may be implemented as a single instance or multiple instances of any one or more of those devices. For example, the external storage medium 1236 may be implemented as an array of hard disk drives.

The I/O interfaces 1220 facilitate the exchange of information between the general purpose computing device 1210 and other computing devices. The I/O interfaces may be implemented using an internal or external modem, an Ethernet connection, or the like, to enable coupling to a transmission medium. In the example of FIG. 12, the I/O interfaces 1222 are coupled to a communications network 1238 and directly to a computing device 1242. The computing device 1242 is shown as a personal computer, but may be equally be practised using a smartphone, laptop, or a tablet device. Direct communication between the general purpose computer 1210 and the computing device 1242 may be implemented using a wireless or wired transmission link.

The communications network 1238 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general purpose computer 1210 is able to communicate via the communications network 1238 to other computing devices connected to the communications network 1238, such as the mobile telephone handset 1244, the touchscreen smartphone 1246, the personal computer 1240, and the computing device 1242.

One or more instances of the general purpose computer 1210 may be utilised to implement a server acting as a host configuration database to implement a system for distributing customised advertising content in accordance with the present disclosure. In such an embodiment, the memory 1214 and storage 1216 are utilised to store data relating to a standardised, independent naming convention and mappings for a set of destination host web pages and applications. Software for implementing the advertising content distribution system is stored in one or both of the memory 1214 and storage 1216 for execution on the processor 1212. The software includes computer program code for implementing method steps in accordance with the method of distributing advertising content described herein.

Figure 13:
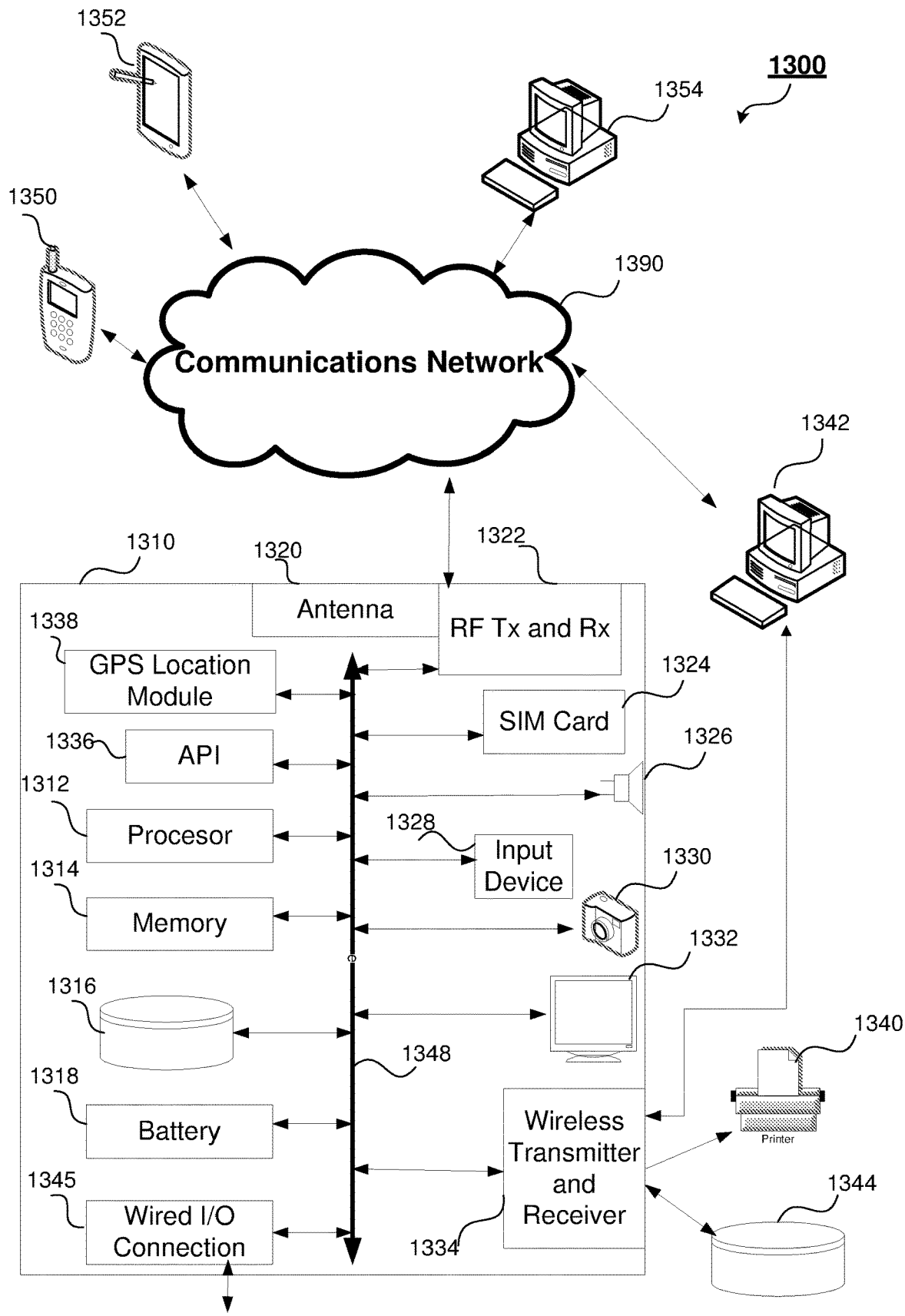
FIG. 13 is a schematic block diagram representation of a system that includes a general smartphone on which one or more embodiments of the present disclosure may be practised.

FIG. 13 is a schematic block diagram of a system 1300 on which one or more aspects of an advertising distribution method and system of the present disclosure may be practised. The system 1300 includes a portable computing device in the form of a smartphone 1310, which may be used by a registered user 1115 of the advertising content distribution system in FIG. 11. The smartphone 1310 includes a plurality of components, including: a processor 1312, a memory 1313, a storage medium 1316, a battery 1318, an antenna 1320, a radio frequency (RF) transmitter and receiver 1322, a subscriber identity module (SIM) card 1324, a speaker 1326, an input device 1328, a camera 1330, a display 1332, and a wireless transmitter and receiver 1334. Components of the smartphone 1310 generally communicate using one or more bus connections 1348 or other connections therebetween. The smartphone 1310 also includes a wired connection 1345 for coupling to a power outlet to recharge the battery 1318 or for connection to a computing device, such as the general purpose computer 1210 of FIG. 12. The wired connection 1345 may include one or more connectors and may be adapted to enable uploading and downloading of content from and to the memory 1313 and SIM card 1324.

The smartphone 1310 may include many other functional components, such as an audio digital-to-analogue and analogue-to-digital converter and an amplifier, but those components are omitted for the purpose of clarity. However, such components would be readily known and understood by a person skilled in the relevant art.

The memory 1313 may include Random Access Memory (RAM), Read Only Memory (ROM), or a combination thereof. The storage medium 1316 may be implemented as one or more of a solid state "flash" drive, a removable storage medium, such as a Secure Digital (SD) or microSD card, or other storage means. The storage medium 1316 may be utilised to store one or more computer programs, including an operating system, software applications, and data. In one mode of operation, instructions from one or more computer programs stored in the storage medium 1316 are loaded into the memory 1313 via the bus 1348. Instructions loaded into the memory 1313 are then made available via the bus 1348 or other means for execution by the processor 1312 to implement a mode of operation in accordance with the executed instructions.

The smartphone 1310 also includes an application programming interface (API) module 1336, which enables programmers to write software applications to execute on the processor 1312. Such applications include a plurality of instructions that may be pre-installed in the memory 1313 or downloaded to the memory 1313 from an external source, via the RF transmitter and receiver 1322 operating in association with the antenna 1320 or via the wired connection 1345.

The smartphone 1310 further includes a Global Positioning System (GPS) location module 1338. The GPS location module 1338 is used to determine a geographical position of the smartphone 1310, based on GPS satellites, cellular telephone tower triangulation, or a combination thereof. The determined geographical position may then be made available to one or more programs or applications running on the processor 1312.

The wireless transmitter and receiver 1334 may be utilised to communicate wirelessly with external peripheral devices via Bluetooth, infrared, or other wireless protocol. In the example of FIG. 13, the smartphone 1310 is coupled to each of a printer 1340, an external storage medium 1344, and a computing device 1342. The computing device 1342 may be implemented, for example, using the general purpose computer 1210 of FIG. 12.

The camera 1326 may include one or more still or video digital cameras adapted to capture and record to the memory 1313 or the SIM card 1324 still images or video images, or a combination thereof. The camera 1326 may include a lens system, a sensor unit, and a recording medium. A user of the smartphone 1310 may upload the recorded images to another computer device or peripheral device using the wireless transmitter and receiver 1334, the RF transmitter and receiver 1322, or the wired connection 1345.

In one example, the display device 1332 is implemented using a liquid crystal display (LCD) screen. The display 1332 is used to display content to a user of the smartphone 1310. The display 1332 may optionally be implemented using a touch screen, such as a capacitive touch screen or resistive touchscreen, to enable a user to provide input to the smartphone 1310.

The input device 1328 may be a keyboard, a stylus, or microphone, for example, for receiving input from a user. In the case in which the input device 1328 is a keyboard, the keyboard may be implemented as an arrangement of physical keys located on the smartphone 610. Alternatively, the keyboard may be a virtual keyboard displayed on the display device 1332.

The SIM card 1324 is utilised to store an International Mobile Subscriber Identity (IMSI) and a related key used to identify and authenticate the user on a cellular network to which the user has subscribed. The SIM card 1324 is generally a removable card that can be used interchangeably on different smartphone or cellular telephone devices. The SIM card 1324 can be used to store contacts associated with the user, including names and telephone numbers. The SIM card 1324 can also provide storage for pictures and videos. Alternatively, contacts can be stored on the memory 1313.

The RF transmitter and receiver 1322, in association with the antenna 1320, enable the exchange of information between the smartphone 1310 and other computing devices via a communications network 1390. In the example of FIG. 13, RF transmitter and receiver 1322 enable the smartphone 1310 to communicate via the communications network 1390 with a cellular telephone handset 1350, a smartphone or tablet device 1352, a computing device 1354 and the computing device 1342. The computing devices 1354 and 1342 are shown as personal computers, but each may be equally be practised using a smartphone, laptop, or a tablet device.

The communications network 1390 may be implemented using one or more wired or wireless transmission links and may include, for example, a cellular telephony network, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a cellular (mobile) telephone cellular network, a short message service (SMS) network, or any combination thereof.

The method and system of the present disclosure enable creative code to interact with functional components from a requesting host web page in a predictable and reliable manner.

INDUSTRIAL APPLICABILITY

The arrangements described are applicable to the electronic publishing industry and particularly for the advertising industry.

The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

We claim:

1. A computer-implemented method for distributing electronic publishing content, comprising the steps of:
    defining an independent naming convention for functional components of host web pages;
    determining, for a predefined set of destination pages, a set of representational states for each destination page, wherein each of the representational states corresponds to a visual layout of a destination page at a moment in time that results from a corresponding user interaction with a user computing device;
    determining, for the representational states for each destination page, a set of conditional statements corresponding to the set of representational states and indicating which user interactions with the user computing device result in which representational states of the set of representational states;
    analyzing said destination pages to identify destination host-specific naming conventions associated with each representational state of the destination pages;
    storing in a host configuration database a mapping table, said mapping table establishing a mapping between said host-specific naming conventions associated with each representational state of the destination pages, the set of conditional statements associated with each representational state, and said independent naming convention;
    a creative ad server receiving a request for advertising content in relation to an advertisement to be displayed within a destination host page on the user computing device, said destination host page being one of said set of destination pages;
    said creative ad server requesting from said host configuration database a mapping between said independent naming convention and a host-specific naming convention associated with each representational state of said destination host page;
    applying said mapping to configure said advertising content by interrogating the host configuration database to retrieve host-specific component mappings against independent components for each representational state to produce destination content compliant with each representational state of said destination host page during a given visit of said destination host page; and
    said creative ad server transmitting said destination content to said user computing device.

2. The computer-implemented method according to claim 1, wherein the set of destination pages are web pages or software applications.

3. The computer-implemented method according to claim 1, wherein said destination host page is one of a web page or a software application executing on said user computing device.

4. The computer-implemented method according to claim 1, wherein said functional components of web pages relate to at least one of a header, article, content, logo, or navigation.

5. The computer-implemented method according to claim 1, wherein each destination page in said set of destination pages is associated with a device.

6. The computer-implemented method according to claim 5, wherein said device is selected from the group consisting of: a desktop computer, a tablet computing device, a phablet, and a smartphone.

7. The computer-implemented method according to claim 1, comprising the further step of:
    the creative ad server being configured to communicate with the host configuration database.

8. The computer-implemented method according to claim 1, wherein said request for advertising content received by said creative ad server includes code relating to a call to the host configuration database for a mapping relating to said destination host page.

9. A host configuration database coupled to a communications network, said host configuration database storing:
    an independent naming convention for functional components of web pages;
    a set of representational states for a predefined set of destination pages, wherein each of the representational states corresponds to a visual layout of a destination page at a moment in time that results from a corresponding user interaction with a user computing device;
    a set of conditional statements corresponding to the set of representational states and indicating which user interactions with the user computing device result in which representational states of the set of representational states; and
    a mapping between said independent naming convention and a host-specific naming convention associated with each representational state of a destination host page, to configure advertising content by interrogating the host configuration database to retrieve host-specific component mappings against independent components for each representational state based on said set of conditional statements;
    wherein, on receipt from a source of a request for a mapping in relation to said destination host page, said host configuration database is adapted to:

determine a current representational state of said destination host page, based on said set of conditional statements;

identify a mapping associated with the current representational state; and transmit said mapping to said source.

10. The host configuration database according to claim 9, wherein said source is one of a web browser or a creative ad server.

11. The host configuration database according to claim 9, wherein the host-specific naming convention associated with a destination host page is dependent on a device on which the destination host page will be displayed.

12. The host configuration database according to claim 11, wherein said device is selected from the group consisting of: a desktop computer, a tablet computing device, a phablet, and a smartphone.

13. A computer-implemented method for distributing electronic publishing content, comprising the steps of:

defining an independent naming convention for functional components of web pages;

determining, for a predefined set of destination pages, a set of representational states for each destination page, wherein each of the representational states corresponds to a visual layout of a destination page at a moment in time that results from a corresponding user interaction with a user computing device;

determining, for the representational states for each destination page, a set of conditional statements corresponding to the set of representational states and indicating which user interactions with the user computing device result in which representational states of the set of representational states;

analyzing said destination pages to identify destination host-specific naming conventions associated with each representational state of the destination pages;

storing in a host configuration database a mapping table, said mapping table to configure advertising content by interrogating the host configuration database to retrieve host-specific component mappings against independent components for each representational state by establishing a mapping between said destination host-specific naming conventions associated with each representational state of the destination pages, the set of conditional statements associated with each representational state, and said independent naming convention;

a creative ad server receiving a request from a source for the advertising content in relation to an advertisement to be displayed within a destination host page on a user computing device, said destination host page being one of said set of destination pages;

said creative ad server delivering creative content to said source, said creative content including an instruction to query said host configuration database to obtain a mapping between said independent naming convention and a destination naming convention associated with each representational state of said destination host page;

sending, based on said instruction, a request from said source to said host configuration database to obtain a mapping between said independent naming convention and the destination host-specific naming convention associated with each representational state of said destination host page during a given visit of said destination host page;

said host configuration database transmitting said mapping to said source;

said source configuring said delivered creative content for said destination host page, based on a current representational state of said destination host page, as determined by said conditional statements; and said creative content detecting changes in an active representational state of said destination host page throughout the duration of a visit, as determined by said conditional statements, and reacting to said changes in the active representational state of said destination host page by dynamically configuring itself with the associated mapping for a new representational state.

14. The computer-implemented method according to claim 13, wherein the set of destination pages are web pages or software applications.

15. The computer-implemented method according to claim 13, wherein said destination host page is one of a web page or a software application executing on said user computing device.

16. The computer-implemented method according to claim 13, wherein said functional components of web pages are HTML elements.

17. The computer-implemented method according to claim 13, wherein each destination page in said set of destination pages is associated with a device.

18. The computer-implemented method according to claim 17, wherein said device is selected from the group consisting of: desktop computer, tablet computing device, phablet, and smartphone.

* * * * *